(12) United States Patent
Ohwa et al.

(10) Patent No.: US 11,356,611 B2
(45) Date of Patent: Jun. 7, 2022

(54) IMAGE CAPTURE APPARATUS AND CONTROL METHOD THEREOF

(71) Applicant: CANON KABUSHIKI KAISHA, Tokyo (JP)

(72) Inventors: Yasushi Ohwa, Machida (JP); Kazunori Takayama, Hachioji (JP); Minoru Sakaida, Kawasaki (JP); Yuji Omori, Kawasaki (JP); Takumi Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/915,694

(22) Filed: Jun. 29, 2020

(65) Prior Publication Data
US 2021/0006722 A1 Jan. 7, 2021

(30) Foreign Application Priority Data
Jul. 1, 2019 (JP) .............................. JP2019-123133
May 12, 2020 (JP) .............................. JP2020-084135

(51) Int. Cl.
*H04N 5/232* (2006.01)
*H04N 5/235* (2006.01)

(52) U.S. Cl.
CPC ....... *H04N 5/23293* (2013.01); *H04N 5/2351* (2013.01); *H04N 5/2353* (2013.01); *H04N 5/23245* (2013.01)

(58) Field of Classification Search
CPC ............ H04N 5/23293; H04N 5/2351; H04N 5/2353; H04N 5/23245; H04N 5/243; H04N 5/232935; H04N 5/232
See application file for complete search history.

(56) References Cited

U.S. PATENT DOCUMENTS

| | | | | |
|---|---|---|---|---|
| 5,600,370 A | * | 2/1997 | Furuyama | G11B 27/028 348/239 |
| 7,379,103 B1 | * | 5/2008 | Matsuda | H04N 5/278 348/239 |
| 8,089,521 B2 | * | 1/2012 | Suzuki | H04N 5/23245 348/220.1 |
| 2002/0196348 A1 | * | 12/2002 | Kubo | H04N 5/772 348/220.1 |
| 2003/0081260 A1 | * | 5/2003 | Suzuki | H04N 1/00278 358/302 |
| 2006/0109385 A1 | * | 5/2006 | Wakako | H04N 21/44016 348/731 |
| 2006/0160528 A1 | * | 7/2006 | Wang | H04M 1/72427 455/418 |
| 2007/0154164 A1 | * | 7/2007 | Liu | H04N 21/4402 386/233 |

(Continued)

FOREIGN PATENT DOCUMENTS

JP 2018006827 A 1/2018

*Primary Examiner* — Jason A Flohre
(74) *Attorney, Agent, or Firm* — Canon U.S.A., Inc. IP Division

(57) ABSTRACT

An image capture apparatus comprising an image sensor is disclosed. When an instruction to shoot a still image has been detected when executing a live view display, the image capture apparatus shoots the still image preferentially, while repeatedly displaying a same image during a period in which the live view display cannot be updated. The image capture apparatus reduces a luminance and/or changes a tone of the image that is repeatedly displayed.

23 Claims, 15 Drawing Sheets

(56) References Cited

U.S. PATENT DOCUMENTS

| | | | | |
|---|---|---|---|---|
| 2007/0212056 A1* | 9/2007 | Nagata | ................... | G03B 19/12 |
| | | | | 396/354 |
| 2008/0273094 A1* | 11/2008 | Kunieda | ................ | H04N 1/212 |
| | | | | 348/220.1 |
| 2014/0071306 A1* | 3/2014 | Kunishige | .......... | H04N 5/23245 |
| | | | | 348/220.1 |
| 2014/0340529 A1* | 11/2014 | Shibata | ................... | H04N 5/74 |
| | | | | 348/189 |

* cited by examiner

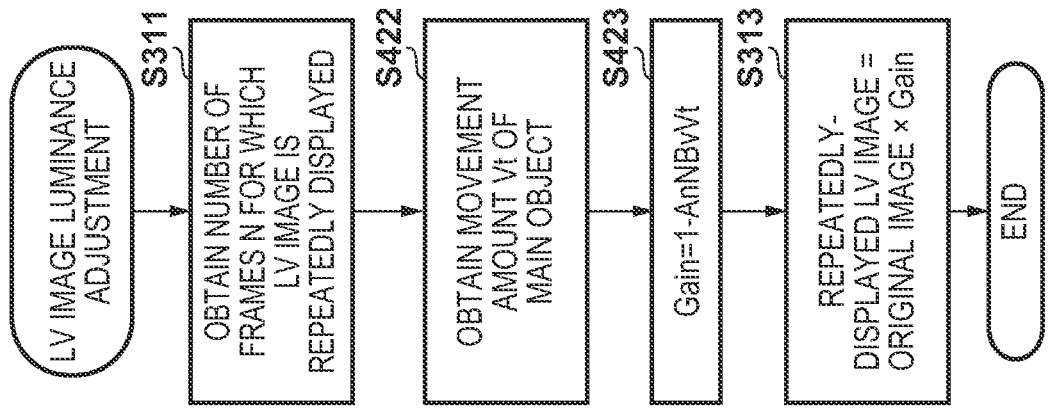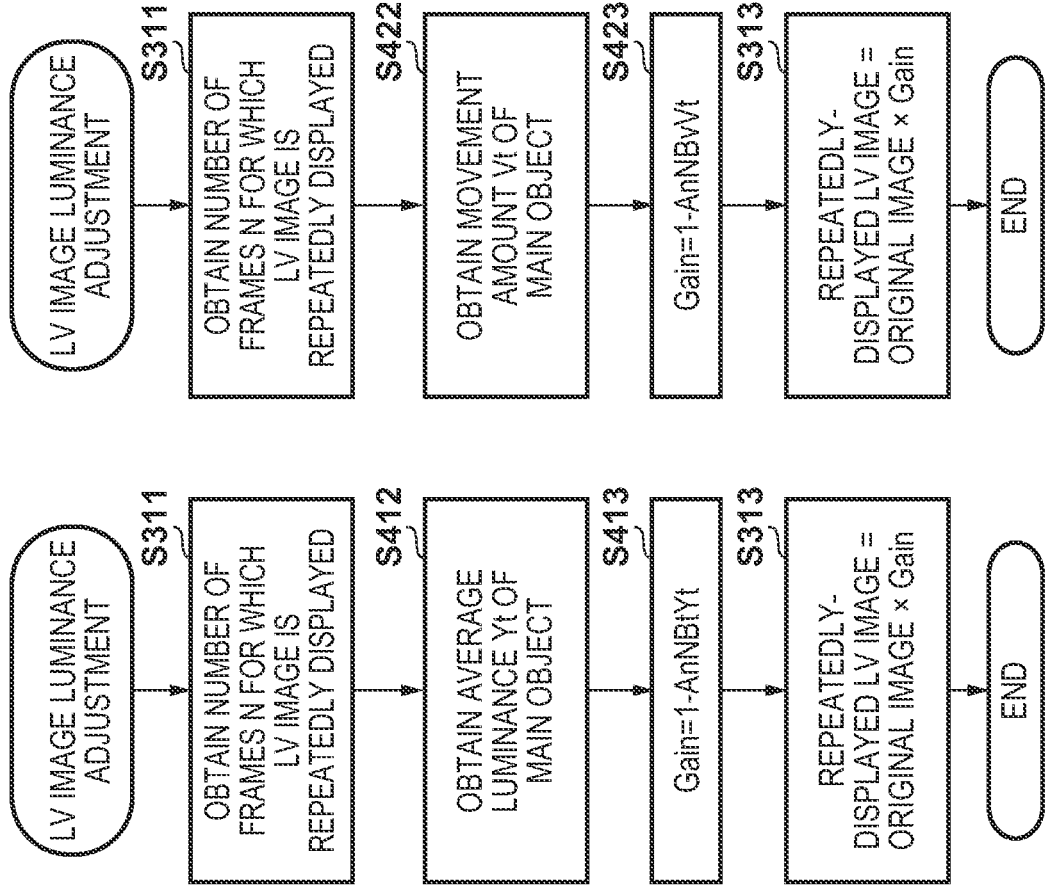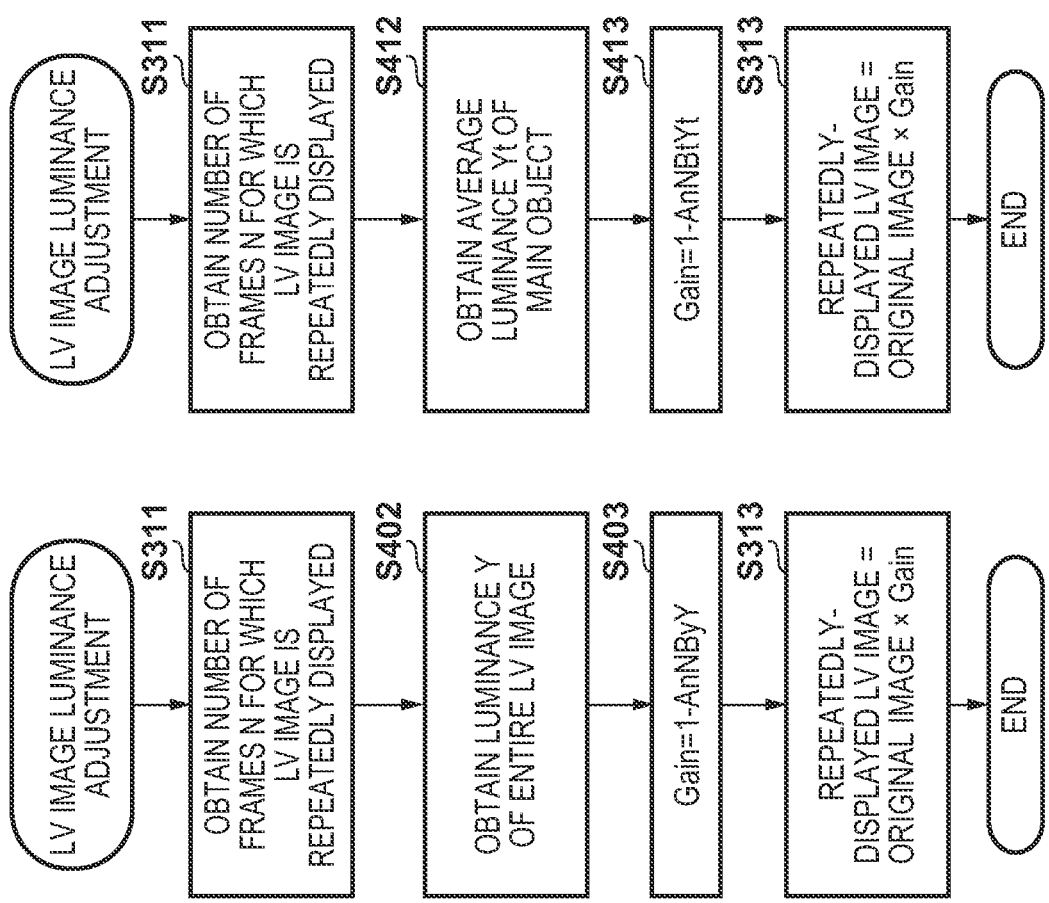

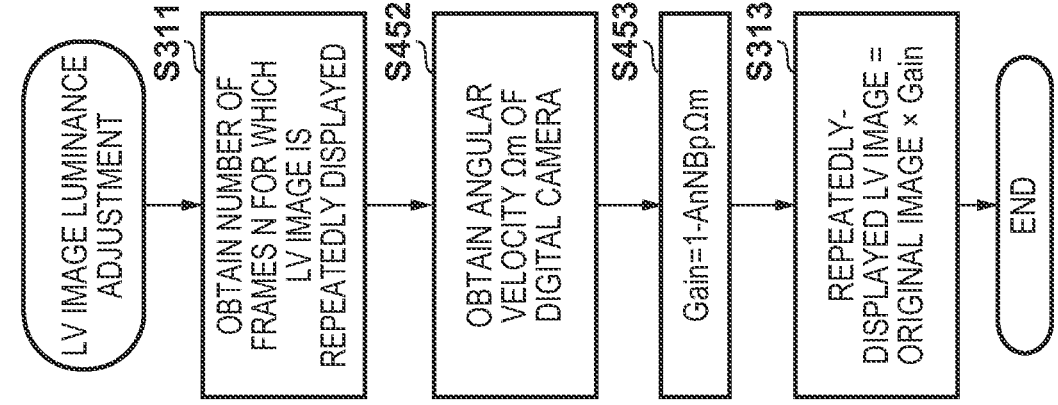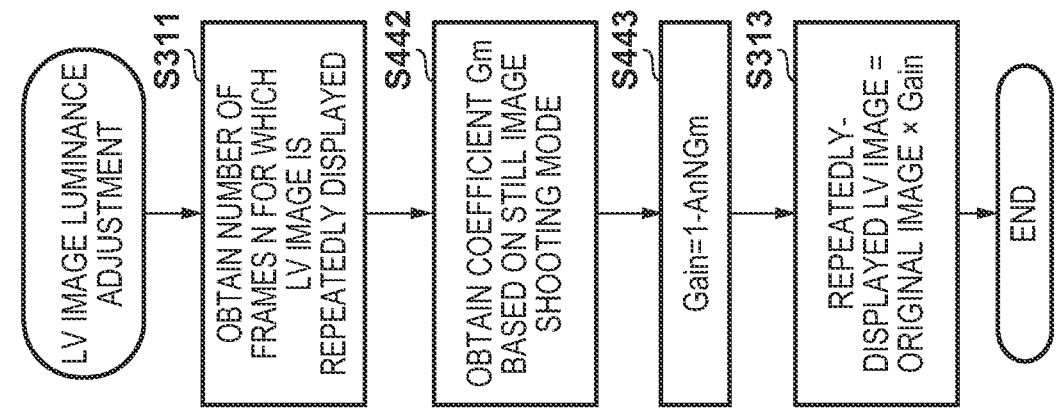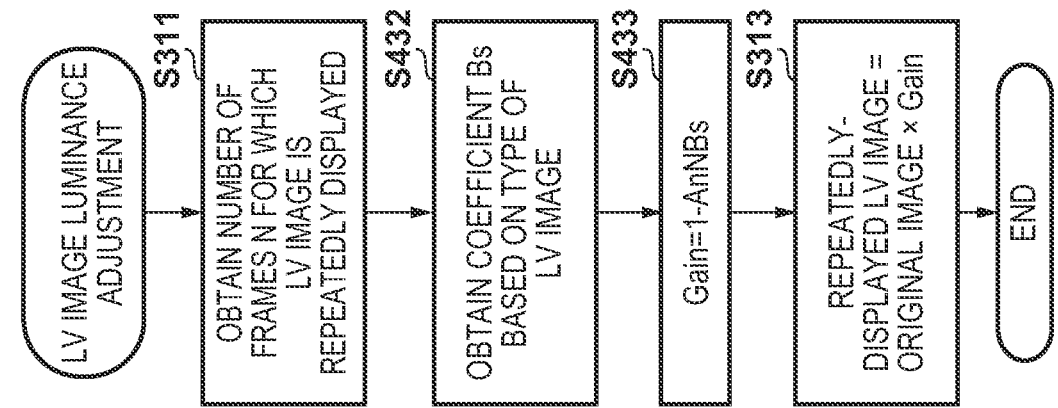

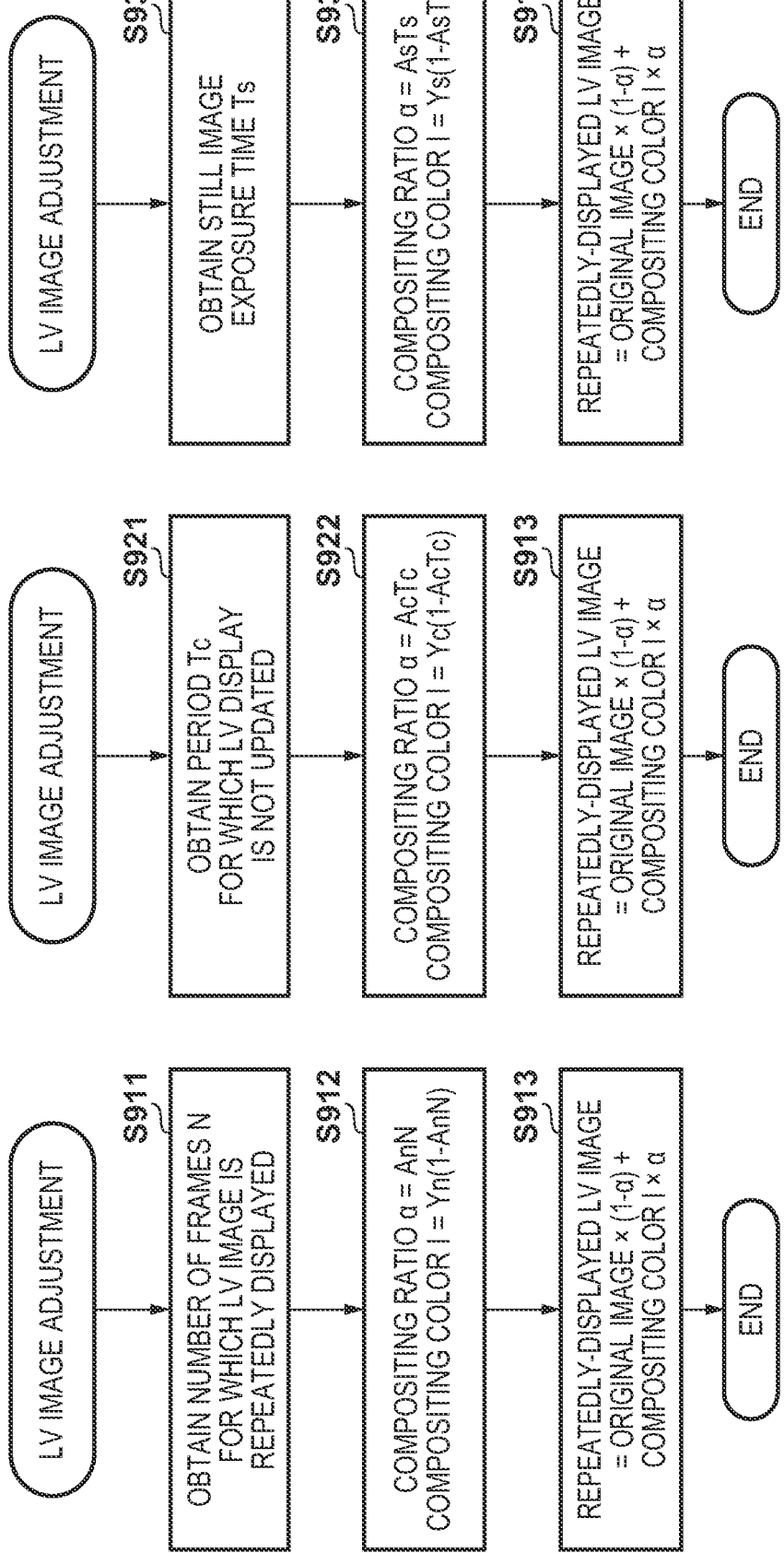

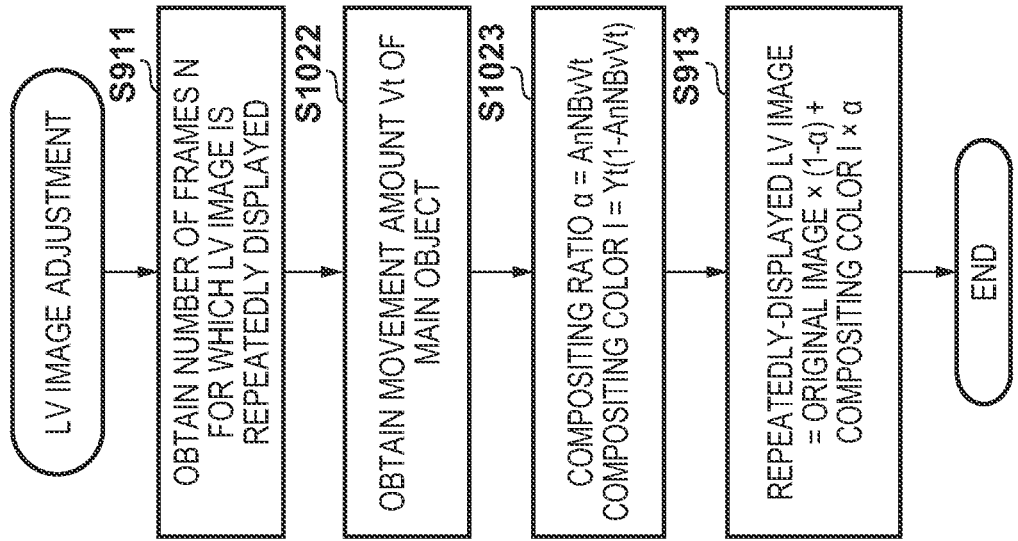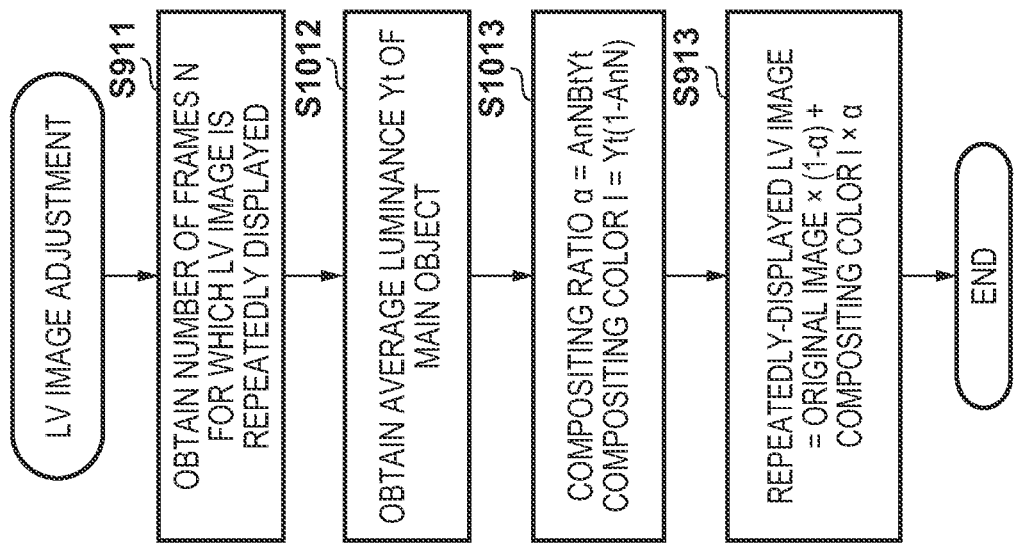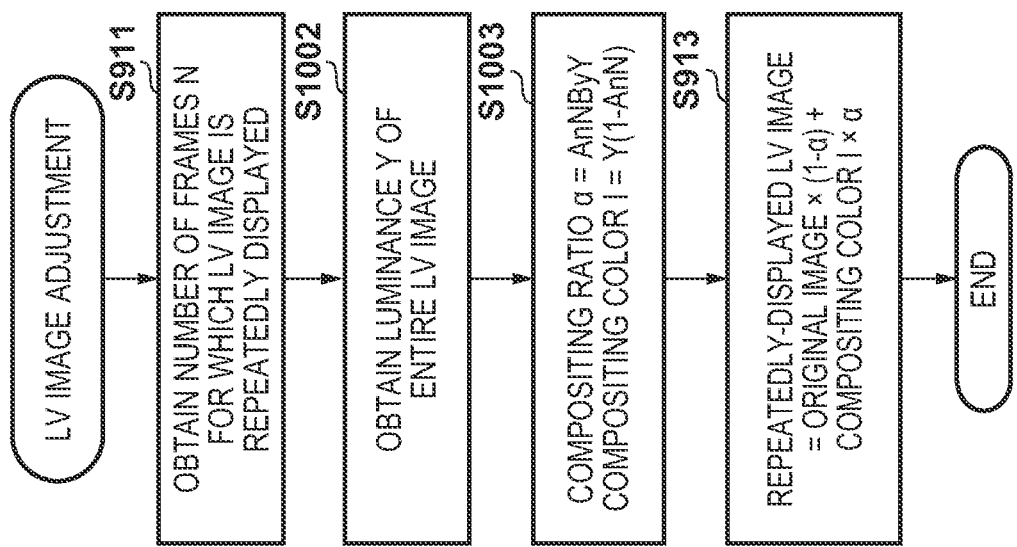

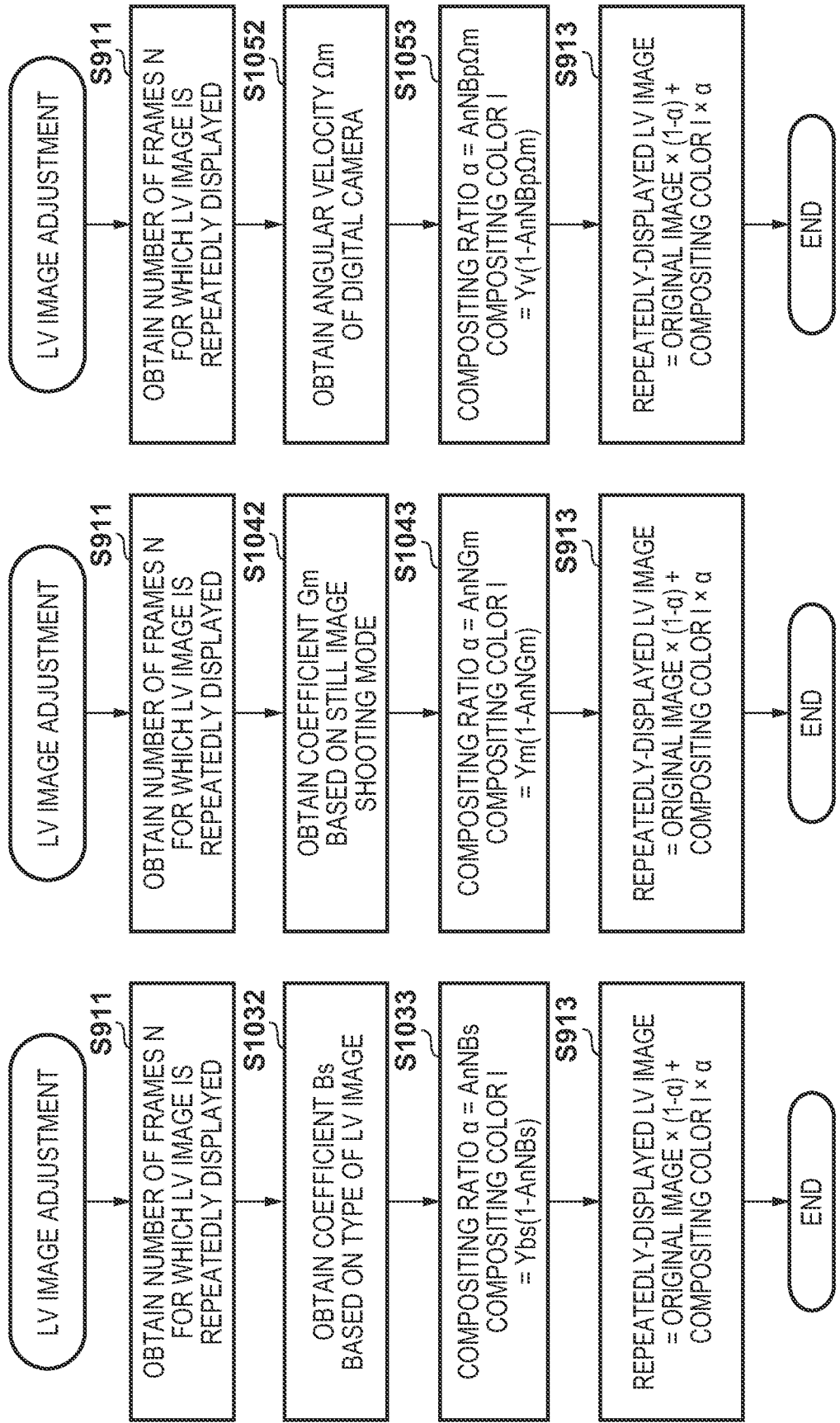

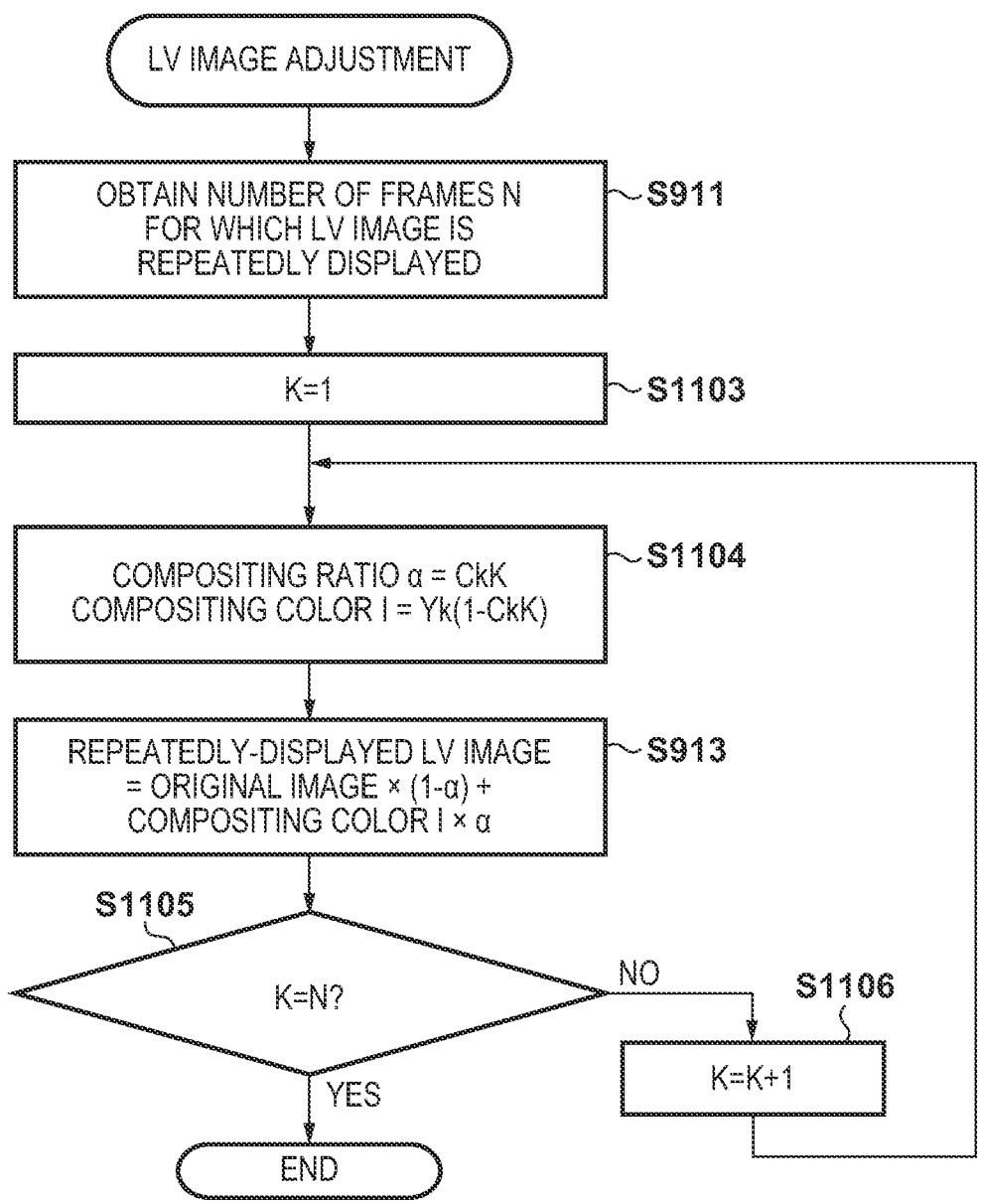

IMAGE CAPTURE APPARATUS AND CONTROL METHOD THEREOF

BACKGROUND OF THE INVENTION

Field of the Invention

The present disclosure relates to an image capture apparatus and a control method thereof.

Description of the Related Art

Some image capture apparatuses which use image sensors have a live view ("LV" hereinafter) display function. The live view display function is a function which quickly and continuously shoots and displays images, enabling a user to confirm the current image capturing range. The LV display is implemented using a display apparatus provided on the rear surface of the housing of the image capture apparatus, within a viewfinder, or the like. The image used in the LV display (an LV image) has a different resolution (number of pixels) and the like from a still image for recording. As such, the image sensor is subjected to different driving control (also called a "driving mode") when shooting a moving image for display (the LV image) from when shooting a still image for recording. For the sake of simplicity, the driving mode used when shooting an LV image will be called a "moving image mode", and the driving control carried out when shooting a still image for recording will be called a "still image mode". A switching operation is necessary in order to switch between the moving image mode and the still image mode.

Consider, for example, a case where an LV display is carried out when shooting a still image, in a configuration where the LV image and an image for recording are shot using the same image sensor. While it is desirable that the update interval of the LV image be constant, there are situations, depending on the timing at which the still image shooting is started, the exposure time, and the like, where the still image driving period overlaps with the expected display driving period.

When prioritizing still image shooting and skipping LV image shooting, either the LV image shot immediately before is displayed on a loop, or a black image is displayed in place of the LV image (a blackout). In a configuration in which a black image is displayed in times aside from the LV display period, Japanese Patent Laid-Open No. 2018-006827 proposes ameliorating a sense that the LV image displayed between black images is dark by using a higher-than-normal display luminance for the LV image.

However, with a configuration that displays a black image when an LV image cannot be shot, there is a major luminance difference between the black image and the LV image, which reduces the visibility, tires the viewer's eyes, and the like. Displaying the LV image at a higher-than-normal luminance as described in Japanese Patent Laid-Open No. 2018-006827 exacerbates this issue. On the other hand, displaying a past LV image on a loop instead of a black image produces unnatural movement in moving objects appearing in the LV display.

SUMMARY OF THE INVENTION

The present disclosure has been conceived in order to solve the issues with past techniques. The present disclosure provides an image capture apparatus which can implement a smooth LV display while suppressing a drop in visibility, even when an LV image cannot be shot due to a still image being shot, and furthermore provides a method of controlling the image capture apparatus.

According to an aspect of the present disclosure, there is provided an image capture apparatus, comprising: an image sensor; and a processor that executes a program stored in a memory and thereby functions as: a control unit configured to carry out control so that, when an instruction to shoot a still image has been detected when executing a live view display by shooting a moving image using the image sensor and displaying the moving image obtained through the shooting, the image sensor shoots the still image preferentially, and a same image is repeatedly displayed during a period in which the live view display cannot be updated due to the shooting of the still image, wherein the control unit reduces a luminance and/or changes a tone of the image that is repeatedly displayed.

According to another aspect of the present disclosure, there is provided a method of controlling an image capture apparatus including an image sensor, the method comprising: carrying out control so that, when an instruction to shoot a still image has been detected when executing a live view display by shooting a moving image using the image sensor and displaying the moving image obtained through the shooting, the image sensor shoots the still image preferentially, and an same image is repeatedly displayed during a period in which the live view display cannot be updated due to the shooting of the still image, wherein in the control, a luminance and/or a tone of the image that is repeatedly displayed is changed.

According to a further aspect of the present disclosure, there is provided a non-transitory computer-readable medium storing a program for causing a computer of an image capture apparatus that comprises an image sensor to function as: a control unit configured to carry out control so that, when an instruction to shoot a still image has been detected when executing a live view display by shooting a moving image using the image sensor and displaying the moving image obtained through the shooting, the image sensor shoots the still image preferentially, and a same image is repeatedly displayed during a period in which the live view display cannot be updated due to the shooting of the still image, wherein the control unit reduces a luminance and/or changes a tone of the image that is repeatedly displayed.

Further features of the present disclosure will become apparent from the following description of exemplary embodiments (with reference to the attached drawings).

BRIEF DESCRIPTION OF THE DRAWINGS

FIGS. 4A to 4F are flowcharts pertaining to LV image luminance adjustment operations, according to a second embodiment.

FIGS. 9A to 9D are flowcharts pertaining to LV image adjustment operations, according to a sixth embodiment.

FIGS. 10A to 10F are flowcharts pertaining to LV image adjustment operations, according to a seventh embodiment.

FIG. 11 is a flowchart pertaining to LV image adjustment operations, according to an eighth embodiment.

DESCRIPTION OF THE EMBODIMENTS

Figure 1:
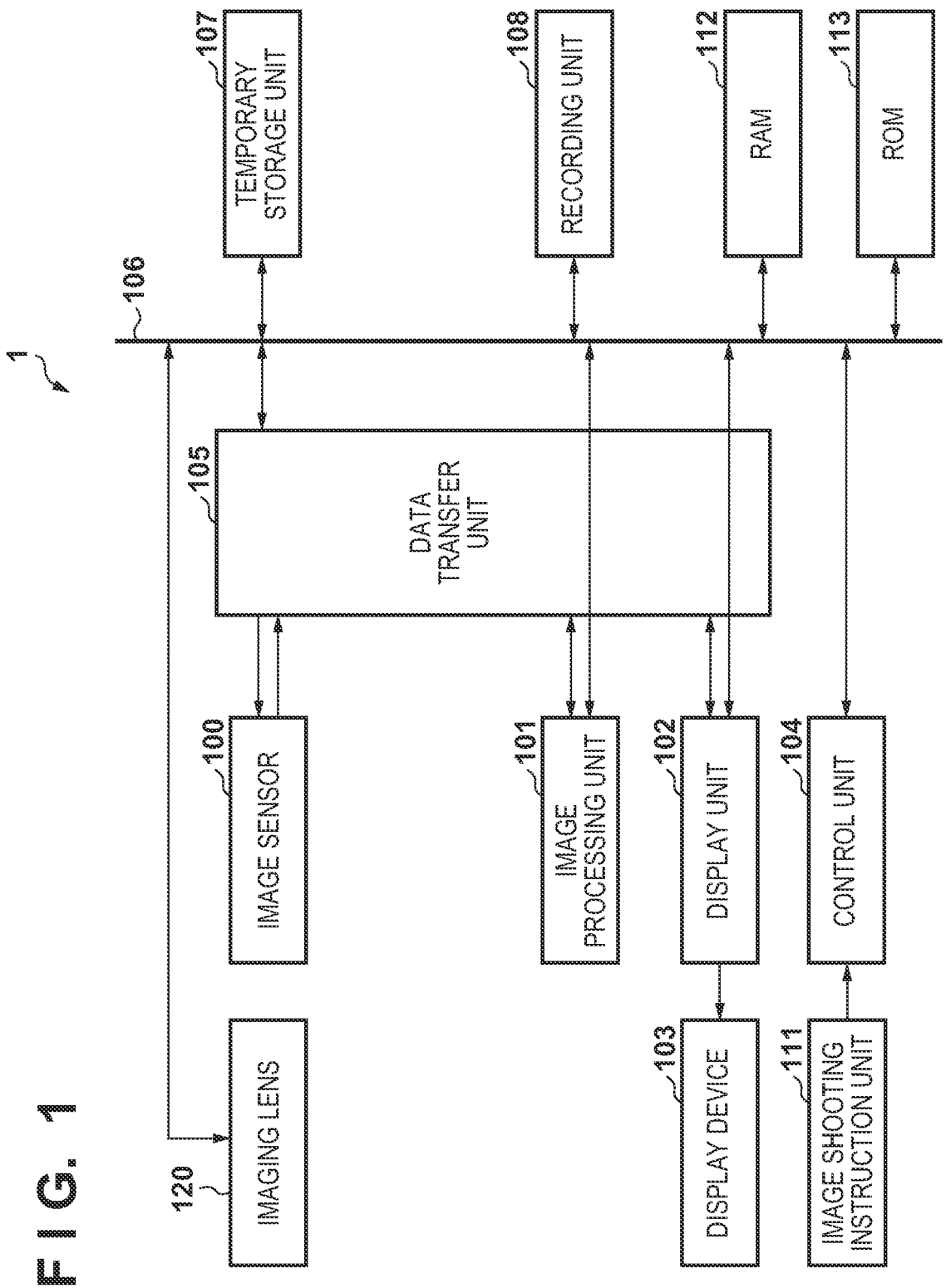
FIG. 1 is a block diagram illustrating an example of the functional configuration of an image capture apparatus according to embodiments.

Hereinafter, embodiments will be described in detail with reference to the attached drawings. Note, the following embodiments are not intended to limit the scope of the present disclosure. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

The following embodiments will describe examples in which the present disclosure is applied in an image capture apparatus such as a digital camera. However, the present disclosure can be applied in any electronic device which has an image capturing function that can shoot a still image while a moving image is being shot using a single image sensor. Examples of such an electronic device include video cameras, computer devices (personal computers, tablet computers, media players, PDAs, and the like), mobile phones, smartphones, game consoles, robots, drones, and dashboard cameras. These are merely examples, however, and the present disclosure can be applied in other electronic devices as well.

First Embodiment

FIG. 1 is a block diagram illustrating an example of the functional configuration of a digital camera 1, serving as an example of an image capture apparatus, according to the present disclosure.

An image sensor 100 is, for example, a CCD image sensor, a CMOS image sensor, or the like, and includes a plurality of pixels, each having a photoelectric conversion unit, arranged in a matrix. The image sensor 100 uses the plurality of pixels to convert an optical image formed by an imaging lens 120 on an image capturing plane into electrical signals, and generates image data constituted by a plurality of pieces of pixel data. The image data generated by the image sensor 100 is written into a temporary storage unit (buffer memory) 107 via a data transfer unit 105.

An image processing unit 101 applies predetermined image processing to moving image data and still image data, and generates image data for display, recording, and the like (live view image data, and still image data for recording and display). The image processing unit 101 applies various types of image processing to the image data stored in the temporary storage unit 107. Image processing applied to image data obtained by shooting a still image includes pre-processing, color interpolation processing, correction processing, data processing, and the like. The pre-processing includes noise reduction, signal amplification, reference level adjustment, missing pixel correction, and the like. Color interpolation processing is processing for interpolating the values of color components not included in the image data read out from the pixels, and is also called "demosaicing". Correction processing includes white balance adjustment, processing for correcting image luminance, processing for correcting aberration from the optical system of the imaging lens 120, color correction processing, and the like. The data processing includes scaling processing, encoding and decoding processing, header information generation processing, and the like. Note that these are merely examples of the image processing which can be carried out when shooting a still image, and the image processing carried out by the image processing unit 101 is not intended to be limited thereto. The image processing unit 101 writes the generated image data into the temporary storage unit 107. In the case where LV image data has been generated, the image processing unit 101 outputs that data to a display unit 102 via the data transfer unit 105.

Note that the image processing unit 101 may apply detection processing, evaluation value calculation processing, and the like to the generated LV image data. The detection processing is detecting a characteristic region (e.g., a face region or a human body region) or movement in such a region, processing for recognizing a person, or the like. The evaluation value calculation processing is processing for calculating an evaluation value used in operations by a control unit 104, such as a pair of image signals for phase difference AF (automatic focus detection), an evaluation value for contrast AF, or an evaluation value used in automatic exposure control (AE). Note that these are merely examples of the image processing which can be carried out by the image processing unit 101, and the image processing carried out by the image processing unit 101 is not intended to be limited thereto.

The display unit 102 receives the LV image data from the temporary storage unit 107 via the data transfer unit 105. The display unit 102 applies processing to the LV image data for displaying that data in a display device 103 as necessary. This processing includes, for example, edge processing for a situation here the display screen of the display device and the LV image have different aspect ratios (letterboxing or the like). The processing also includes processing for adding metadata such as the time the image was shot, adding a GUI image such as an OSD image, converting signal formats, and so on.

The display unit 102 outputs the LV image data, to which the necessary processing has been applied, to the display device 103. The display device 103 is, for example, a liquid crystal display (LCD) or an organic light-emitting diode (OLED) display. The display device 103 which displays the LV image data (the moving image data) functions as an electronic viewfinder (EVF).

An image shooting instruction unit 111 is an input member through which the user instructs the digital camera 1 to shoot a still image. The image shooting instruction unit 111 may be a release button provided in the digital camera 1, or may be another input member such as a remote controller. The user instruction made through the image shooting instruction unit 111 is detected by the control unit 104.

The control unit 104 includes a CPU, and loads programs stored in ROM 113, for example, into RAM 112 and executes those programs. Note that a Field Programmable Gate Array (FPGA), which is a programmable processor, may be used instead of a CPU. The control unit 104 implements the functions of the digital camera 1 by controlling the operations of the respective function blocks. The ROM 113 is, for example, rewritable non-volatile memory, and stores programs which can be executed by the CPU of the control unit 104, configuration data, GUI data, and the like. The RAM 112 is used to load programs executed by the CPU of the control unit 104, store values required while programs are being executed, and so on. As will be described later, the control of readout operations from the image sensor 100 is primarily handled by the control unit 104. The control unit 104 also includes a system timer, which measures times used in various types of control, measures the time of an internal clock, and so on.

The data transfer unit 105 is constituted by a plurality of Direct Memory Access (DMA) controllers (DMACs), for example. Various types of image data are temporarily stored in the temporary storage unit 107 via a bus 106 by the DMACs. The image data stored in the temporary storage unit 107 is read out to the bus 106 by the DMACs, and is then supplied to the various units connected to the data transfer unit 105.

The data transfer unit 105 generates a vertical synchronization signal (sensor V sync signal) 110 used by the image sensor 100 for shooting and reading out moving image data (the LV image data for display, here) and supplies that signal to the image sensor 100. For example, if the framerate of the moving image is 60 frames/second, the data transfer unit 105 generates the sensor V sync signal at a cycle of 1/60 seconds.

If an instruction to shoot a still image has been detected while a moving image is being shot, the control unit 104 temporarily stops the generation of the sensor V sync signal by the data transfer unit 105 and then switches a readout mode of the image sensor 100 from a moving image readout mode to a still image readout mode. The control unit 104 then generates a synchronization signal in accordance with the timing at which the still image is shot (a still image sync signal) and supplies that signal to the image sensor 100.

Once one frame's worth of a still image has been shot, the control unit 104 switches the readout mode of the image sensor 100 from the still image readout mode to the moving image readout mode. The control unit 104 then causes the data transfer unit 105 to resume the generation of the sensor V sync signal 110.

The bus 106 includes a system bus and a data bus, which are independent from each other, for example. The function blocks connected to the bus 106 are capable of bidirectional communication.

The temporary storage unit 107 is constituted by a memory control unit and memory, and writes data into the memory, reads data out from the memory, and so on in response to instructions from the control unit 104 or the data transfer unit 105. The temporary storage unit 107 is also used as a buffer for the moving image data and still image data.

A recording unit 108 records still image data and moving image data for recording, generated by the image processing unit 101, and records that data into a recording medium such as a memory card under the control of the control unit 104. The recording unit 108 also reads out image data recorded in the recording medium, under the control of the control unit 104. The control unit 104 stores the read-out image data in the temporary storage unit 107.

The digital camera according to the present embodiment enters a shooting standby state upon being started up using a power switch. In the shooting standby state, the control unit 104 executes the LV display continuously, and stands by for an instruction to shoot a still image or a moving image input through an operation unit 109. In the shooting standby state, the control unit 104 can execute exposure control, focus control, and the like based on the evaluation values obtained from the image processing unit 101. When an instruction to shoot a still image is input while in the shooting standby state, the control unit 104 starts a process for shooting a still image. The still image data obtained from this shooting is processed by the image processing unit 101 and then stored in the temporary storage unit 107.

Additionally, the control unit 104 recognizes the continuous input of instructions to shoot a still image as a still image continuous shooting instruction, and repeatedly executes the process for shooting a still image until the input of image shooting instructions ends or the number of continuous shots reaches a predetermined upper limit value. Note that the configuration may be such that the continuous input of instructions to shoot a still image is only recognized as continuous shooting processing when a continuous shooting mode is set using a mode selection dial.

Once the input of the instruction to shoot a still image ends, the control unit 104 puts the still image data stored in the temporary storage unit 107 into a data file in a predetermined format and records that file into the recording unit 108, which is a memory card or the like. The time it takes from when an instruction to shoot a still image is input in the shooting standby state to when the still image shooting is actually started will be called a "release time" (or "release time lag"). Additionally, the interval between the timing at which the control unit 104 takes two consecutive shots during the continuous shooting of still images is called a "continuous shooting interval".

Figure 2A:
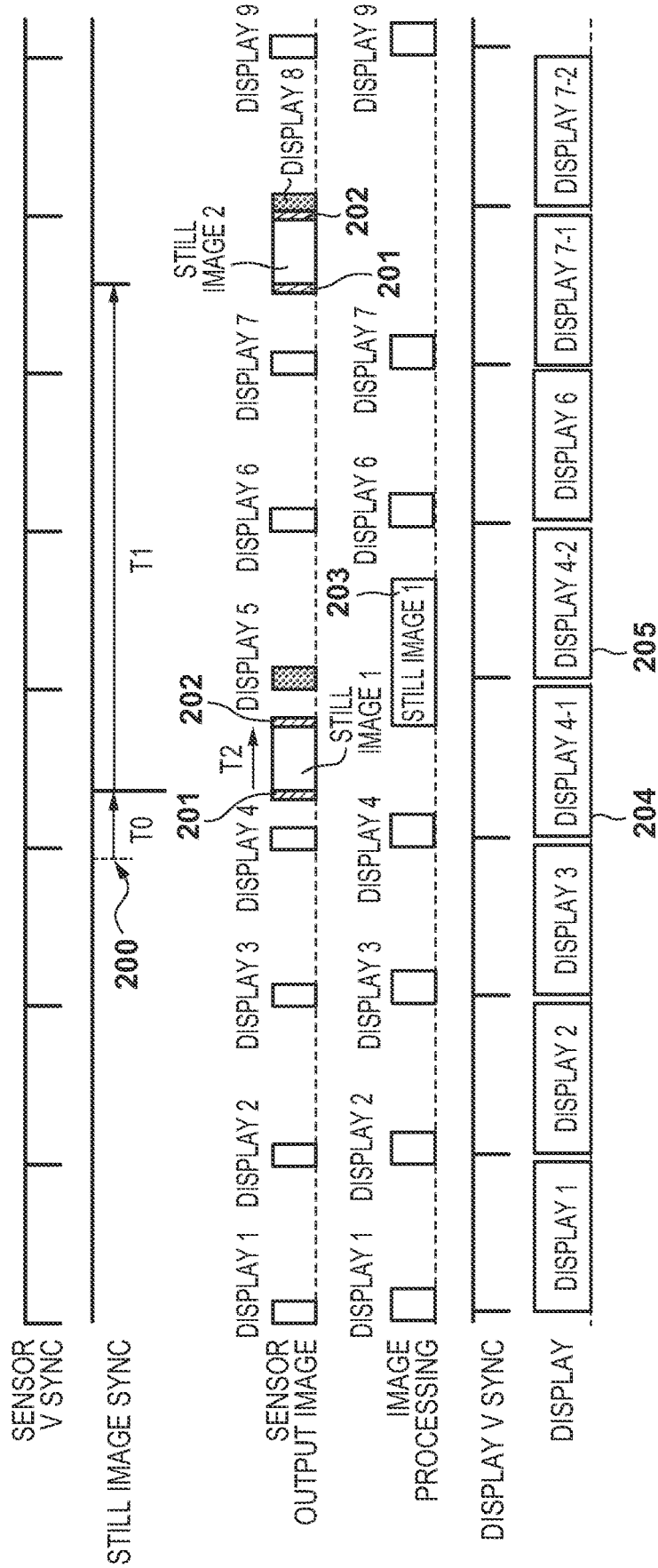
FIGS. 2A and 2B are timing charts pertaining to operations carried out when shooting a still image while a moving image is being shot, according to a first embodiment.
Figure 2B:
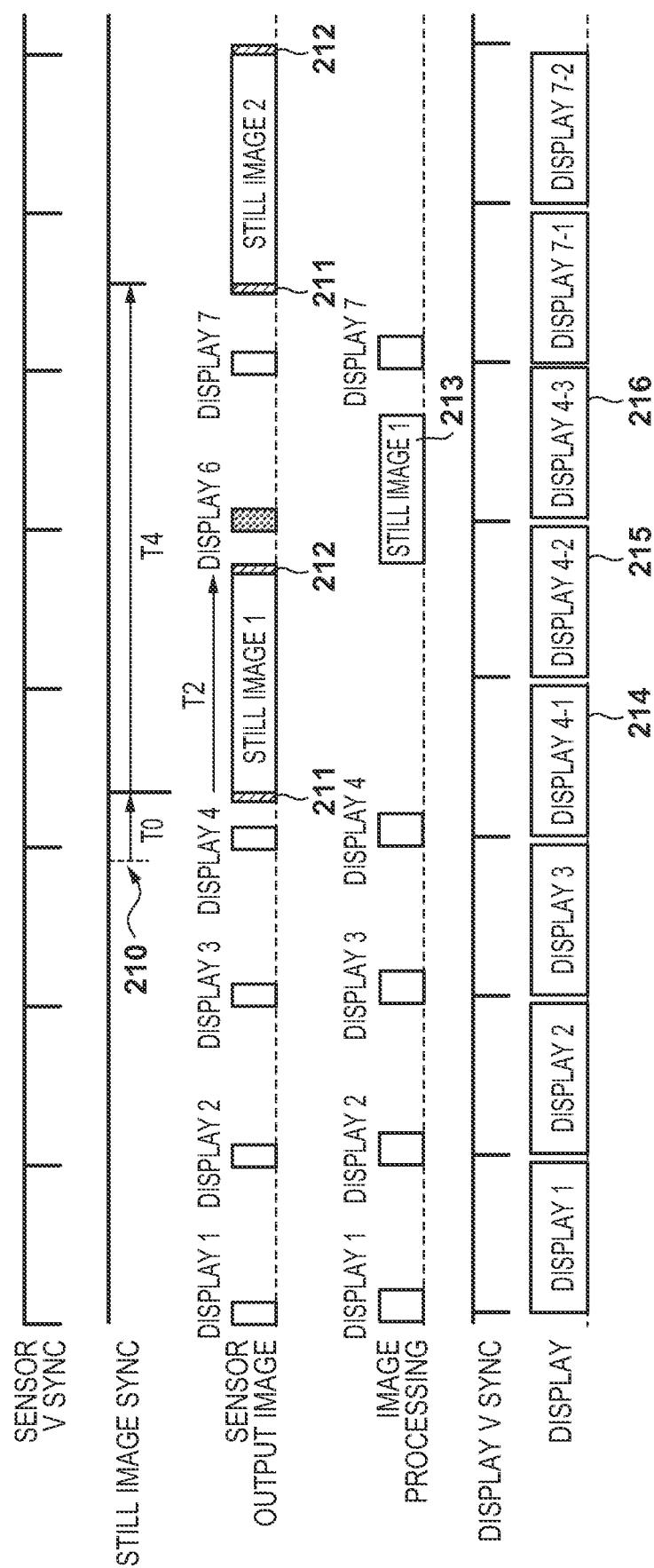

FIGS. 2A and 2B are timing charts pertaining to still image continuous shooting and live view display (LV display) operations by the digital camera according to the present embodiment, and the passage of time corresponds to progress in the rightward direction. FIGS. 2A and 2B have different exposure times when shooting a still image.

FIGS. 2A and 2B are diagrams schematically illustrating timing control for shooting and display operations when shooting a still image while making a live view display (displaying a moving image). The horizontal axis represents time, which advances as the charts progress from the left to the right. These charts illustrate continuous shooting in which instructions to shoot a still image are input continuously.

The sensor V sync (signal) indicates the output timing of a vertical synchronization signal, which indicates the timing of the start of exposure and data readout for the LV image from the image sensor 100. As described above, the vertical synchronization signal is output at a cycle based on the framerate of the LV image (the moving image).

The still image sync (signal) is a signal indicating the timing at which the still image data is read out from the image sensor 100. The control unit 104 generates the still image sync signal at a predetermined timing while an instruction to shoot a still image is being input from the image shooting instruction unit 111. In the present embodiment, when an instruction to shoot a still image is detected, first, the control unit 104 outputs the still image sync signal after a set amount of time (the release time) T0. Then, the control unit 104 outputs the still image sync signal at a predetermined continuous shooting interval T1 while the instruction to shoot a still image is being continuously input.

"Sensor output image" indicates a period in which the image sensor 100 is capturing an image and image data (LV image data and still image data) is read out, and a period in which LV image (moving image) readout and still image readout are switched (a readout mode switching period). "Display 1" to "display 9" indicate LV image capturing and readout periods (a moving image driving period or a first driving period), and "still image 1" and "still image 2" indicate still image capturing and readout periods (a still image driving period or a second driving period). 201 and 202 indicate driving mode switching periods of the image sensor 100. 201 indicates a period for switching from a driving mode for obtaining the LV image (moving image) (the moving image mode) to a driving mode for obtaining a still image (the still image mode), and 202 indicates a period for switching from the still image mode to the moving image mode. The driving mode of the image sensor 100 is switched by, for example, the control unit 104 changing settings in the image sensor 100.

The LV image, which is a moving image for display, and the still image for recording, have different resolutions, exposure times, and the like. In particular, the LV image has a lower resolution than the still image data, and thus a lower amount of image data is read out. Additionally, in the example illustrated in FIGS. 2A and 2B, an exposure time T2 for the still image is longer than an exposure time for the moving image. The moving image driving period is therefore shorter than the still image driving period. Note that of the displays 1 to 9, the LV image data is not actually read out in the moving image driving periods indicated by displays 5 and 8, and displays 5 and 8 are therefore hatched.

"Image processing" indicates an image processing period of the image processing unit 101. Displays 1, 2, 3, 4, 6, 7, and 9 and still images 1 and 2 indicate sensor output images subject to processing. The image processing period is a period extending from when the image data read out from the image sensor 100 is supplied to the image processing unit 101 via the temporary storage unit 107, to when the data is again stored in the temporary storage unit 107 after the image processing.

With respect to the LV image, the data starts being supplied to the image processing unit 101 without waiting for an entire screen's worth of image data to be stored in the temporary storage unit 107. However, with respect to still images, the data starts being supplied to the image processing unit 101 only after an entire screen's worth of still image data read out from the image sensor 100 has been stored in the temporary storage unit 107. However, this is not absolutely required, and the operations for storing the data from the image sensor 100 in the temporary storage unit 107 and the operations for supplying the data from the temporary storage unit 107 to the image processing unit 101 may be carried out in parallel, as with the LV image. Note that the data transfer unit 105 only supplies the image data stored in the temporary storage unit 107 to the image processing unit 101. No image data is supplied to the image processing unit 101 without first being stored in the temporary storage unit 107.

"Display V sync" is a vertical synchronization signal of the display device 103. Note that the LV display can be carried out more in real-time by shortening delay of the display V sync with respect to the sensor V sync.

"Display" indicates the display period of the display device 103, and the image which is displayed. Note that display 4 and display 7 are each output in two consecutive frames because the LV image data corresponding to displays 5 and 8 are not generated.

FIG. 2B will be described next. While the still image exposure time T2 falls within one cycle of the image capturing display V sync and display V sync in FIG. 2A, the exposure time T2 is longer in FIG. 2B, extending across two cycles. Due to the still image exposure time T2 being longer, the image processing period for still image 1 is delayed, from 203 to 213. As a result, in FIG. 2B, display 6 cannot be displayed, and display 4 is displayed repeatedly for three frames. In this manner, the number of frames for which the LV image is repeatedly displayed changes depending on the still image exposure time.

FIGS. 2A and 2B illustrate an example of a case where the still image exposure time T2 falls within one cycle of the image capturing display V sync and the display V sync, and a case where the exposure time T2 extends across two cycles. However, if the still image exposure time T2 becomes even longer, the number of frames for which the LV image is repeatedly displayed will increase to four or more.

FIGS. 3A to 3D are flowcharts pertaining to luminance adjustment operations in a case where the same LV image is displayed repeatedly for two or more frames. The LV image luminance adjustment may be carried out by the image processing unit 101 when generating the LV image, or may be carried out by the display unit 102 when processing the LV image. The operations illustrated in FIGS. 3A to 3D are executed by the control unit 104.

Figure 3A:
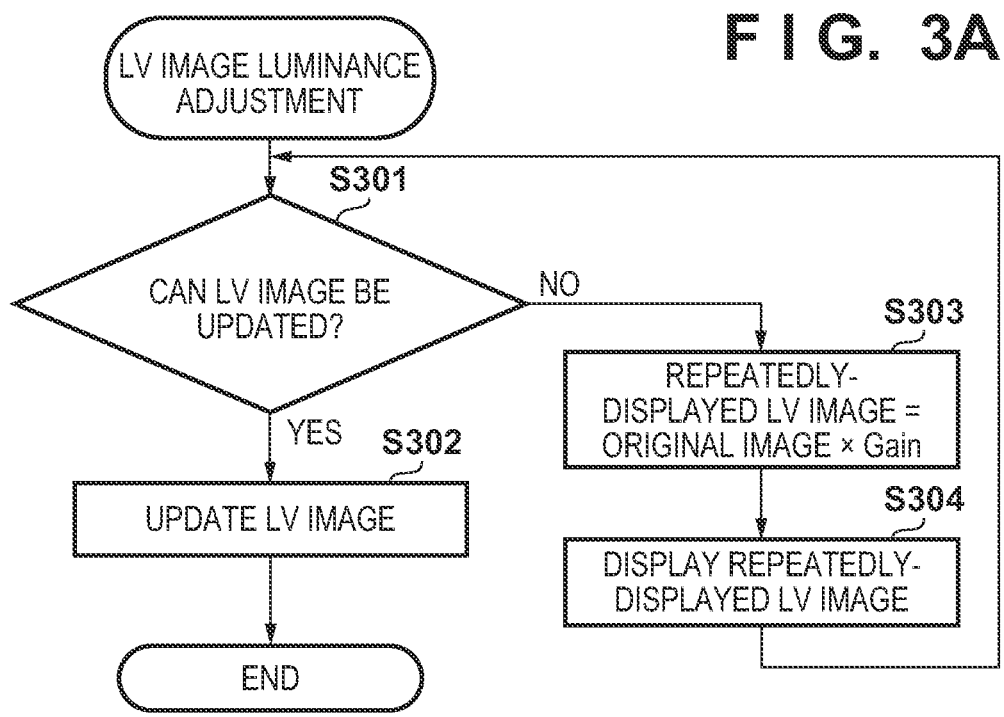
FIGS. 3A to 3D are flowcharts pertaining to LV image luminance adjustment operations, according to the first embodiment.

FIG. 3A is a flowchart pertaining to operations for adjusting the luminance of the LV image displayed repeatedly, in a period where the LV display cannot be updated. The control unit 104 executes these operations repeatedly each time still image shooting operations are started, for example.

In step S301, the control unit 104 determines whether or not the LV image can be updated. For example, the control unit 104 may determine that the LV image can be updated if the image processing by the image processing unit 101, or the processing by the display unit 102, has been completed up to a certain stage, for the LV image shot after the LV image currently being displayed. Alternatively, the control unit 104 can determine that the LV image cannot be updated if the exposure period for the still image shooting or the image processing period of the still image data overlaps with the timing of the next display V sync. Note, however, that the determination method is not particularly limited, and any other desired method can be employed. If the control unit 104 determines that an LV image newer than the LV image currently being displayed can be displayed, the sequence moves to step S302, and if not, the sequence moves to step S303.

In step S302, the control unit 104 causes the new LV image to be displayed in the display device 103 through the display unit 102. This is the same as the processing for updating the LV image in the shooting standby state. Note that in the present embodiment, the control unit 104 determines that (one frame's worth of) still image shooting has ended upon the LV image being in an updatable state after the start of still image shooting, and then ends the LV image luminance adjustment operations. However, (one frame's worth of) still image shooting may be determined to have ended on the basis of other conditions, such as the readout of the still image data from the image sensor 100 being complete.

In step S303, the control unit 104 adjusts the luminance of the repeatedly-displayed LV image. In the present embodiment, for same LV images, the luminance of the image displayed first is not adjusted, but the luminance of the image displayed repeatedly (that is, the second and subsequent images) is displayed at a lower luminance than the first image. The luminance is adjusted by, for example, multiplying the pixel values (RGB values or luminance values) of the original image (the LV image for which the luminance has not been adjusted) by a predetermined gain (e.g., a coefficient greater than or equal to a lower limit value which is less than 1 and greater than 0). As described earlier, the luminance adjustment may be carried out by the image processing unit 101 or by the display unit 102. For example, the luminance adjustment may be carried out by the display unit 102 when the original image data (the most recent LV image data) is held in the display unit 102, when the image data which has been subjected to the processing by the image processing unit 101 is held in the temporary storage unit 107, and so on. The control unit 104 instructs the image processing unit 101 or the display unit 102 to adjust (reduce) the luminance of the LV image to be displayed next. The gain value may be specified by the control unit 104, or may be held or determined by the image processing unit 101 or the display unit 102.

In step S304, the control unit 104 controls the display unit 102 so that the luminance-adjusted LV image is displayed from the next display V sync. The control unit 104 then returns the sequence to step S301, and the processing of steps S303 and S304 is repeated until it is determined that the LV image can be updated. Note that in the example of FIG. 3A, the amount of the luminance reduction relative to the original image is constant, regardless of the number of frames for which the image is displayed repeatedly. As such, the processing of step S303 may be skipped when there is already luminance-adjusted LV image data, such as when the most recent LV image data is held in the display unit 102.

Figure 3B:
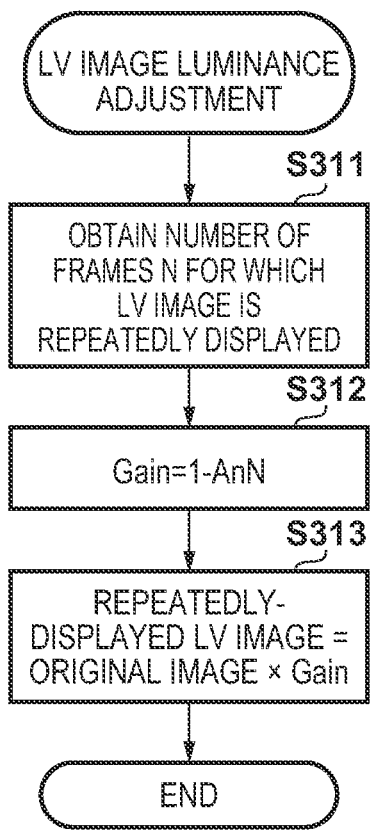
Figure 3C:
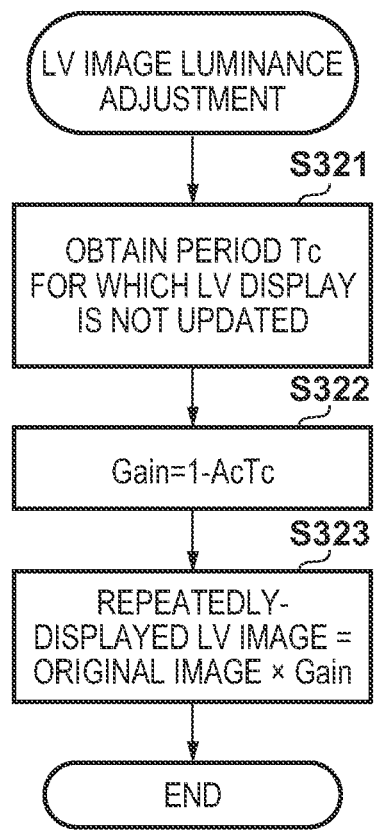
Figure 3D:
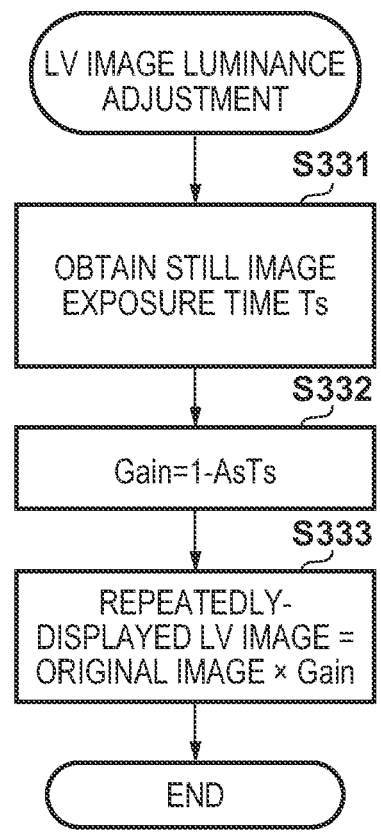

Meanwhile, FIGS. 3B to 3D illustrate an example in which the gain applied to the original image is changed dynamically. The control unit 104 can execute the operations of one of FIGS. 3B to 3D in place of the operations of step S303 in FIG. 3A.

In step S311 of FIG. 3B, the control unit 104 obtains a number of frames (number of times) N (where N≥1) for which the LV image cannot be updated due to still image shooting and the most recent LV image will therefore be displayed repeatedly. Here, the second display corresponds to N=1. The control unit 104 can take the number of display V syncs from when the still image shooting is started as N, for example, but N may be obtained through another method as well.

In step S312, the control unit 104 determines the value of the gain to be applied to the original image. It is assumed here that the control unit 104 determines the gain value as Gain=1−An×N. An is a fixed coefficient, and the value of An can be determined, for example, on the basis of a predetermined maximum number for N, so that the gain value is a value greater than or equal to a lower limit value and less than 1. Alternatively, if the real value of An×N has exceeded 1, a maximum value less than 1 may be used. The gain value decreases as N increases (that is, the amount of the reduction of the luminance increases). Accordingly, the luminance is adjusted so that as the number of times the same LV image is displayed repeatedly increases, the images become darker than the original image. Note that although the lower limit value of the gain may be any value greater than 0, the lower limit value can be set to approximately 0.2 to 0.3, for example. The lower limit value can be found experimentally in advance.

In step S313, the control unit 104 adjusts the luminance of the repeatedly-displayed LV image, as described with reference to FIG. 3A.

In step S321 of FIG. 3C, the control unit 104 obtains a period Tc (msec) for which the LV image cannot be updated due to still image shooting and the most recent LV image will therefore be displayed repeatedly. The control unit 104 can obtain the period Tc by measuring the amount of time that has passed from the first display V sync arising after the start of the still image shooting, for example, but the period Tc may be obtained through another method as well.

In step S322, the control unit 104 determines the value of the gain to be applied to the original image. It is assumed here that the control unit 104 determines the gain value as Gain=1−Ac×Tc. Ac is a fixed coefficient, and the value of Ac can be determined, for example, on the basis of a predetermined maximum number for Tc, so that the gain value is a value greater than or equal to a lower limit value and less than 1. Alternatively, if the real value of Ac×Tc has exceeded 1, a maximum value less than 1 may be used. The gain value decreases as Tc becomes longer (increases) (that is, the amount of the reduction of the luminance increases). Accordingly, the luminance is adjusted so that as the time for which the LV image cannot be updated due to still image shooting becomes longer, the images become darker than the original image.

In step S323, the control unit 104 adjusts the luminance of the repeatedly-displayed LV image, as described with reference to FIG. 3A.

In step S331 of FIG. 3D, the control unit 104 obtains an exposure time Ts (sec) used in the still image shooting. The control unit 104 can obtain the exposure time Ts by measuring the time from the start of exposure, for example, but the exposure time Ts may be obtained through a different method.

In step S332, the control unit 104 determines the value of the gain to be applied to the original image. It is assumed here that the control unit 104 determines the gain value as Gain=1−As×Ts. As is a fixed coefficient, and the value of As can be determined, for example, on the basis of a predetermined maximum number for Ts, so that the gain value is a value greater than or equal to a lower limit value and less than 1. Alternatively, if the real value of As×Ts has exceeded 1, a maximum value less than 1 may be used. Furthermore, if 1−As×Ts is lower than the lower limit value of the gain, the gain is taken as the lower limit value. The gain value decreases as the exposure time Ts becomes longer (that is, the amount of the reduction of the luminance increases). Accordingly, the luminance is adjusted so that as the exposure time Ts of the still image shooting becomes longer, the images become darker than the original image.

In step S323, the control unit 104 adjusts the luminance of the repeatedly-displayed LV image, as described with reference to FIG. 3A.

Note that the gain value in the operations described with reference to FIGS. 3B and 3D may be fixed for the period spanning from the start to the end of one frame's worth of still image shooting. In this case, in step S311 of FIG. 3B and step S321 of FIG. 3C, the control unit 104 can obtain N and Tc on the basis of the exposure time for still image shooting, the expected image processing period, the timing of the display V sync, and the display period, for example. Additionally, an exposure time Ts obtained as the inverse of a shutter speed set as an exposure condition may be used in step S331 of FIG. 3D.

As described with reference to FIGS. 3A to 3D, the digital camera according to the present embodiment repeatedly displays the most recent LV image, instead of a black image, in a period where the LV display cannot be updated due to still image shooting. The luminance of the LV image will therefore not change greatly, as happens when a black image is displayed. Furthermore, the luminance of the repeatedly-displayed LV image is reduced compared to the original luminance, and thus a difference in the state of a moving object arising the next time the LV image is updated will be less noticeable. This makes it possible to improve the visibility of the LV display when the updating of the LV image is stopped or when the updating is resumed.

Second Embodiment

A second embodiment of the present disclosure will be described next. In the present embodiment, the value of the gain used to adjust the luminance of the original image is determined taking into account other information, such as information obtained from the displayed LV image, in addition to the number of frames N for which the LV image is displayed repeatedly.

FIGS. 4A to 4F are flowcharts pertaining to operations for determining the gain value, according to the present embodiment. In FIGS. 4A to 4F, steps carrying out the same processing as those in FIG. 3B will be given the same reference signs.

FIG. 4A illustrates an example in which the gain value is determined taking into account luminance information of the LV image. In step S311, the control unit 104 obtains the number of frames N for which the LV image is displayed repeatedly. Then, in step S402, the control unit 104 obtains a luminance Y pertaining to the overall LV image displayed repeatedly (before luminance correction). The luminance Y may be luminance information obtained from the image processing unit 101 as an evaluation value for exposure control. The luminance Y may be an average luminance of the image as a whole, for example. Alternatively, the luminance Y may be information such as a luminance histogram of the image as a whole. In this case, the control unit 104 can use a predetermined method to generate the luminance information to be applied in determining the gain value from the luminance histogram. A range of values which the luminance Y can take on may be from 0 to 255, or may be normalized from 0 to 1.

In step S403, the control unit 104 determines the value of the gain to be applied to the original image. It is assumed here that the control unit 104 determines the gain value as Gain=1−An×N×By×Y. An is a fixed coefficient, and the value of An can be determined, for example, on the basis of a predetermined maximum number for N, so that the value of An×N is greater than 0 and less than 1. Alternatively, if the real value of An×N has exceeded 1, a maximum value less than 1 may be used. By is a fixed coefficient, and the value of By can be determined, for example, on the basis of a predetermined maximum value of the luminance Y, so that the value of By×Y is greater than 0 and less than or equal to 1. Alternatively, if the real value of By×Y has exceeded 1, 1 may be used. Note that if 1−An×N×By×Y is lower than the lower limit value of the gain, the gain is taken as the lower limit value. The gain value decreases as N increases or as the luminance Y increases (that is, the amount of the reduction of the luminance increases).

In step S313, the control unit 104 adjusts the luminance of the repeatedly-displayed LV image, as described with reference to FIG. 3A.

FIG. 4B illustrates another example in which the gain value is determined taking into account luminance information of the LV image. In step S311, the control unit 104 obtains the number of frames N for which the LV image is displayed repeatedly. Then, in step S412, the control unit 104 obtains a luminance Yt pertaining to a main object region in the LV image displayed repeatedly (before luminance correction). The luminance Yt may be luminance information obtained from the image processing unit 101 as an evaluation value for exposure control. The luminance Yt may be, for example, the average luminance of a main object region detected in the LV image (a region corresponding to a predetermined feature, such as a face region or a human body region). Alternatively, the luminance Yt may be information such as a luminance histogram of the main object region. In this case, the control unit 104 can use a predetermined method to generate the luminance information to be applied in determining the gain value from the luminance histogram. A range of values which the luminance Yt can take on may be from 0 to 255, or may be normalized from 0 to 1.

In step S413, the control unit 104 determines the value of the gain to be applied to the original image. It is assumed here that the control unit 104 determines the gain value as Gain=1−An×N×Bt×Yt. An is the same as described with reference to FIG. 4A. Bt is a fixed coefficient, and the value of Bt can be determined, for example, on the basis of a predetermined maximum value of the luminance Yt, so that the value of Bt×Yt is greater than 0 and less than or equal to 1. Alternatively, the maximum value of Bt×Yt may be set to 1, and when the real value has exceeded 1, 1 may be used. Note that if 1−An×N×Bt×Yt is lower than the lower limit value of the gain, the gain is taken as the lower limit value. The gain value decreases as N increases or as the luminance Yt increases (that is, the amount of the reduction of the luminance increases).

In step S313, the control unit 104 adjusts the luminance of the repeatedly-displayed LV image, as described with reference to FIG. 3A.

FIG. 4C illustrates an example in which the gain value is determined taking into account movement of a main object. In step S311, the control unit 104 obtains the number of frames N for which the LV image is displayed repeatedly. Then, in step S422, the control unit 104 obtains a movement amount Vt pertaining to a main object region in the LV image displayed repeatedly (before luminance correction). Here, the movement amount Vt is a change in the position of the main object region detected between the LV image displayed repeatedly and one LV image previous thereto, and can be found by the image processing unit 101. Accordingly, the control unit 104 can obtain the movement amount Vt of the main object from the image processing unit 101.

In step S423, the control unit 104 determines the value of the gain to be applied to the original image. It is assumed here that the control unit 104 determines the gain value as Gain=1−An×N×Bv×Vt. An is the same as described with reference to FIG. 4A. By is a fixed coefficient, and the value of By can be determined, for example, on the basis of a predetermined maximum value of the movement amount Vt, so that the value of Bv×Vt is greater than 0 and less than or equal to 1. Alternatively, the maximum value of Bv×Vt may be set to 1, and when the real value has exceeded 1, 1 may be used. Note that if 1−An×N×Bv×Vt is lower than the lower limit value of the gain, the gain is taken as the lower limit value. The gain value decreases as N increases or as the movement amount Vt increases (that is, the amount of the reduction of the luminance increases).

In step S313, the control unit 104 adjusts the luminance of the repeatedly-displayed LV image, as described with reference to FIG. 3A.

FIG. 4D illustrates operations for determining the gain value in a case where an LV image generated from a still image can be displayed. For example, when an LV image cannot be shot due to still image shooting, it is conceivable to generate an LV image from a still image obtained by shooting a still image. In this case, the image processing unit 101 or the display unit 102 generates the LV image (the original image) from still image data held in the temporary storage unit 107.

In step S311, the control unit 104 obtains the number of frames N for which the LV image is displayed repeatedly. Then, in step S432, the control unit 104 determines the type of the displayed LV image. Specifically, the control unit 104 determines whether or not the displayed LV image was generated from a still image. Note that whether to repeatedly display the most recent LV image (captured in the moving image mode) or display an LV image generated from a still image shot thereafter can be determined by the control unit 104 in accordance with a predetermined condition. For example, if greater than or equal to a predetermined percentage of image processing is complete for the still image data, the control unit 104 can determine to display the LV image generated from the still image, whereas if that percentage of the image processing is not complete, the control unit 104 can determine to display the most recent LV image (captured in the moving image mode).

Then, the control unit 104 determines the value of a coefficient Bs used when determining the gain value. Here, the control unit 104 sets the coefficient Bs for the case where the LV image generated from a still image is displayed to a predetermined fixed value in a range of 0<Bs<1, and sets the coefficient Bs to 1 for the case where an LV image not generated from a still image (i.e., captured in the moving image mode) is displayed.

In step S433, the control unit 104 determines the value of the gain to be applied to the original image. It is assumed here that the control unit 104 determines the gain value as Gain=1−An×N×Bs. An is the same as described with reference to FIG. 4A. Note that if 1−An×N×Bs is lower than the lower limit value of the gain, the gain is taken as the lower limit value. The gain value decreases as N increases (that is, the amount of the reduction of the luminance increases). Additionally, the gain value decreases further when an LV image shot in the moving image mode is repeatedly displayed than when an LV image generated from a still image is displayed. This is because the still image used to generate the LV image has been shot after the LV image shot in the moving image mode.

In step S313, the control unit 104 adjusts the luminance of the repeatedly-displayed LV image, as described with reference to FIG. 3A.

FIG. 4E illustrates an example in which the gain value is determined taking into account a still image shooting mode. Here, the still image shooting mode is assumed to be one of shooting a single image (single shooting), low-speed continuous shooting, and high-speed continuous shooting. In step S311, the control unit 104 obtains the number of frames N for which the LV image is displayed repeatedly.

In step S442, the control unit 104 obtains the still image shooting mode which is set from the RAM 112, for example. A coefficient Gm for each still image shooting mode is stored in the ROM 113 as a table, for example. The control unit 104 obtains the value of Gm corresponding to the current still image shooting mode from the table stored in the ROM 113. The coefficient Gm is a value greater than 0 and less than or equal to 1, and when single shooting is taken as the continuous shooting having the lowest speed, the coefficient Gm is set so that the value thereof does not change or decreases as the speed of the continuous shooting decreases. Here, for example, the coefficient Gm is assumed to be 0.4 for single shooting, 0.6 for low-speed continuous shooting, and 0.8 for high-speed continuous shooting.

In step S443, the control unit 104 determines the value of the gain to be applied to the original image. It is assumed here that the control unit 104 determines the gain value as Gain=1−An×N×Gm. An is the same as described with reference to FIG. 4A. Note that if 1−An×N×Gm is lower than the lower limit value of the gain, the gain is taken as the lower limit value. The gain value decreases as N increases or as the speed of the continuous shooting increases (that is, the amount of the reduction of the luminance increases).

In step S313, the control unit 104 adjusts the luminance of the repeatedly-displayed LV image, as described with reference to FIG. 3A.

Figure 6:
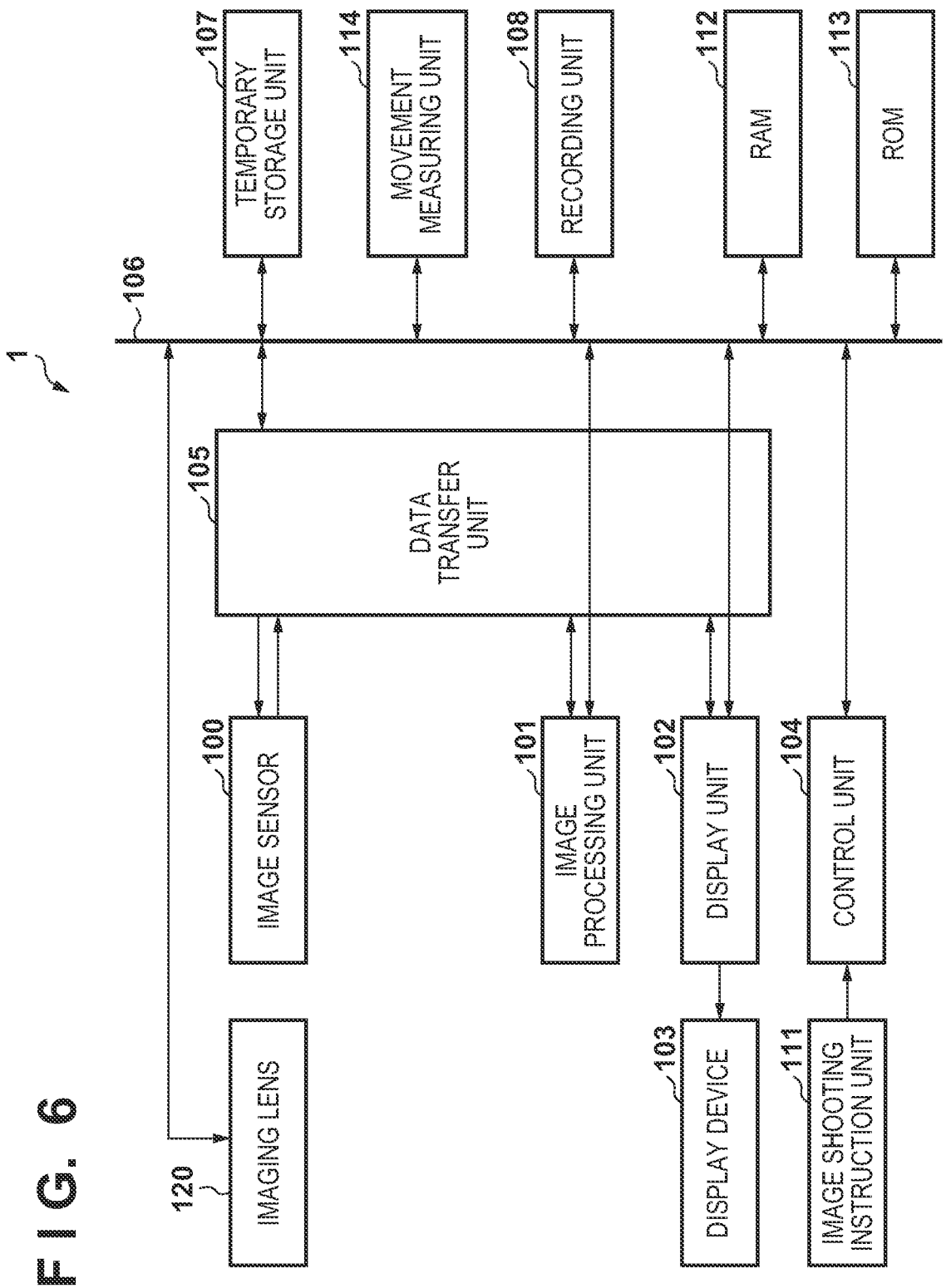
FIG. 6 is a block diagram illustrating an example of the functional configuration of another image capture apparatus according to embodiments.

FIG. 4F illustrates an example in which the gain value is determined taking into account movement of the digital camera 1. FIG. 6 is a block diagram illustrating a configuration in which a movement measuring unit 114 which measures movement of the digital camera 1 is provided in the digital camera 1. Configurations that are the same as in FIG. 1 will be given the same reference signs.

The movement measuring unit 114 outputs a signal indicating movement of the digital camera 1 to the control unit 104. The movement measuring unit 114 may, for example, be a gyrosensor that measures the magnitude of an angular velocity as the movement of the digital camera 1. Note that the movement measuring unit 114 may be a movement sensor provided for image stabilization.

In step S311, the control unit 104 obtains the number of frames N for which the LV image is displayed repeatedly. Then, in step S452, the control unit 104 obtains, from the movement measuring unit 114, a signal indicating an angular velocity Ωm (deg/sec) as the movement of the digital camera 1. The angular velocity Ωm is updated when the LV image is updated. Note that if the movement measuring unit 114 outputs angular velocities for a plurality of rotation axes, the control unit 104 finds a single representative angular velocity from the plurality of angular velocities through a predetermined method. For example, the representative angular velocity may be the highest of the plurality of angular velocities, or may be an average value or a total value of the plurality of angular velocities. When the movement measuring unit 114 outputs angular velocities for a plurality of rotation axes, the "angular velocity Ωm" is assumed to refer to the representative, angular velocity hereinafter.

In step S453, the control unit 104 determines the value of the gain to be applied to the original image. It is assumed here that the control unit 104 determines the gain value as Gain=1−An×N×Bp×Ωm. An is the same as described with reference to FIG. 4A. Bp is a fixed coefficient, and the value of Bp can be determined, for example, so that the value of Bp×Ωm is greater than 0 and less than or equal to 1, within a predetermined range of values which the angular velocity Ωm can take on. Alternatively, when Bp×Ωm exceeds an upper limit value of 1, the value may be corrected (clipped) to 1. Note that if 1−An×N×Bp×Ωm is lower than the lower limit value of the gain, the gain is taken as the lower limit value. The gain value decreases as N increases or as the angular velocity Ωm increases (that is, the amount of the reduction of the luminance increases).

In step S313, the control unit 104 adjusts the luminance of the repeatedly-displayed LV image, as described with reference to FIG. 3A.

Although the movement of the digital camera 1 is described as being measured using the movement measuring unit 114 here, the movement of the digital camera 1 may be measured from the LV image. For example, movement of the image as a whole may be detected in the same manner as the movement of the main object region is detected in step S412, and that movement may be used as the movement of the digital camera 1.

Additionally, a situation where the gain value is determined taking into account other information in the operations described in the first embodiment with reference to FIG. 3B has been described here with reference to FIGS. 4A to 4F. However, the configuration of the present embodiment can also be applied in combination with the configurations illustrated in FIGS. 3C and 3D.

According to the present embodiment, determining the gain value taking into account other information makes it possible to adjust the luminance at a finer level, in addition to the effects of the first embodiment. This makes it possible to implement effective luminance adjustment by improving the visibility.

Third Embodiment

Figure 5:
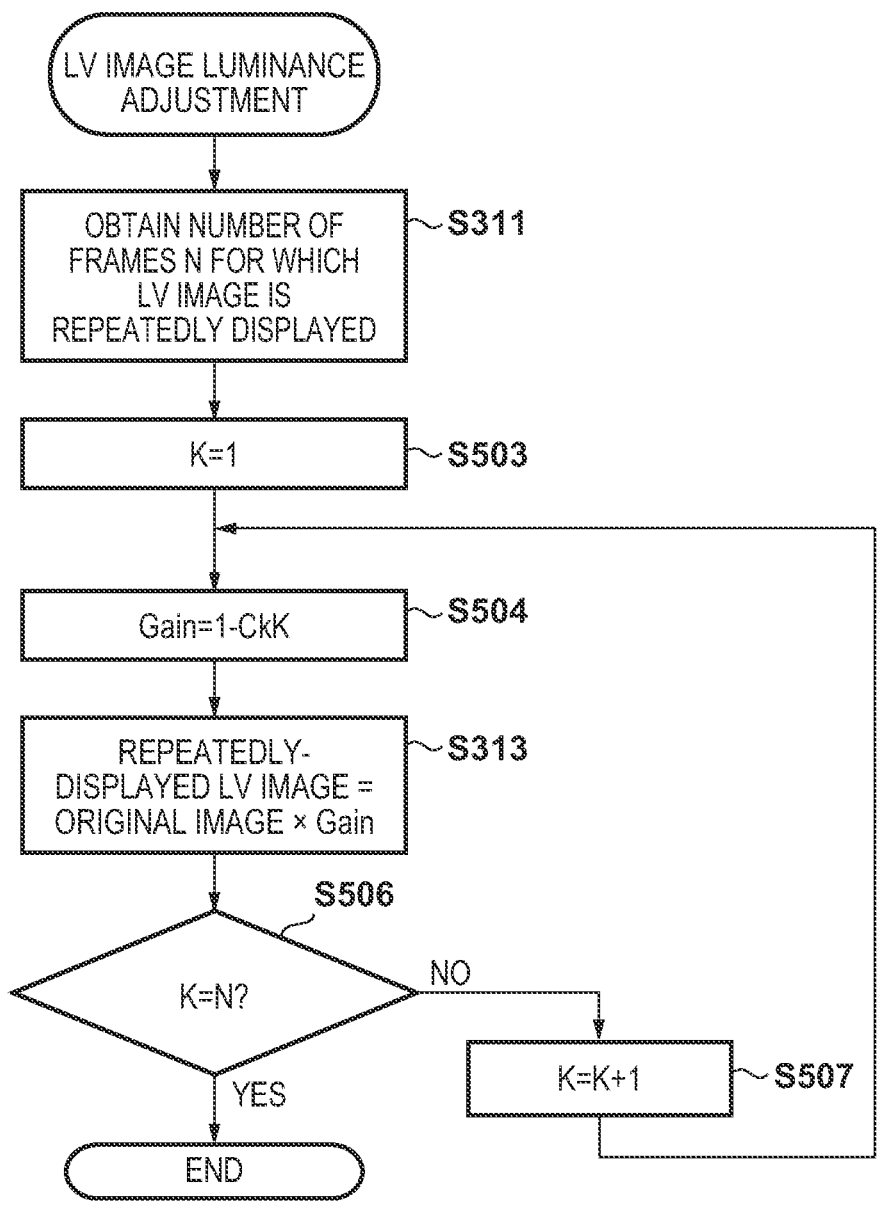
FIG. 5 is a flowchart pertaining to LV image luminance adjustment operations, according to a third embodiment.

A third embodiment of the present disclosure will be described next. The present embodiment describes a configuration in which the amount by which the luminance decreases is changed as the number of frames for continuous display increases, and this configuration can be combined with the configurations of the first and second embodiment (configurations where the luminance of the LV image is fixed during the continuous display). A configuration combined with FIG. 3B, described in the first embodiment, will be described here. In FIG. 5, steps carrying out the same processing as those in FIG. 3B will be given the same reference signs.

In step S311, the control unit 104 obtains the number of frames N for which the LV image is displayed repeatedly.

In step S503, the control unit 104 resets a loop number K to 1.

In step S504, the control unit 104 finds the gain value. It is assumed here that the control unit 104 determines the gain value as Gain=1−Ck×K. Ck is a fixed coefficient, and the value of Ck can be determined, for example, on the basis of a predetermined maximum number for N, so that the value of Ck×N is greater than 0 and less than 1. Alternatively, if the real value of Ck×K has exceeded 1, a maximum value less than 1 may be used. Note that if 1−Ck×K is lower than the lower limit value of the gain, the gain is taken as the lower limit value. The gain value decreases as K increases (that is, the amount of the reduction of the luminance increases). Accordingly, the display luminance decreases in each frame during the period in which the same LV image is displayed repeatedly.

In step S313, the control unit 104 adjusts the luminance of the repeatedly-displayed LV image, as described with reference to FIG. 3A.

In step S506, the control unit 104 determines whether or not K has become equal to N. If so, the sequence ends, but if not, the sequence moves to step S507. In step S507, the control unit 104 increments K by 1 and returns the sequence to step S504. In this manner, the luminance of the LV image is reduced in each frame until the number of times for which the LV image is repeatedly displayed reaches N, obtained in step S311.

A configuration in which the gain value is changed as the number of times the image is displayed repeatedly increases, in the operations described in the first embodiment with reference to FIG. 3B, has been described here. However, the configuration of the present embodiment can also be applied in combination with the configurations illustrated in FIGS. 3C and 3D. In this case, if the period Tc, the exposure time Ts, or the like spans a plurality of frames, the amount of the reduction may be adjusted for each frame.

According to the present embodiment, changing (reducing) the gain value gradually each time the same LV image is displayed repeatedly makes it possible to adjust the luminance at a finer level, in addition to the effects of the first and second embodiments. This makes it possible to implement effective luminance adjustment by improving the visibility.

Fourth Embodiment

A fourth embodiment of the present disclosure will be described next. The present embodiment describes a configuration in which the luminance of the LV image displayed repeatedly is controlled taking into account movement of the digital camera 1, and can be applied in the digital camera 1 including the movement measuring unit 114, illustrated in FIG. 6. The present embodiment assumes that the angular velocity $\Omega m$ (deg/sec) described with reference to FIG. 4F (the second embodiment) is used as the movement of the digital camera 1.

Figure 7:
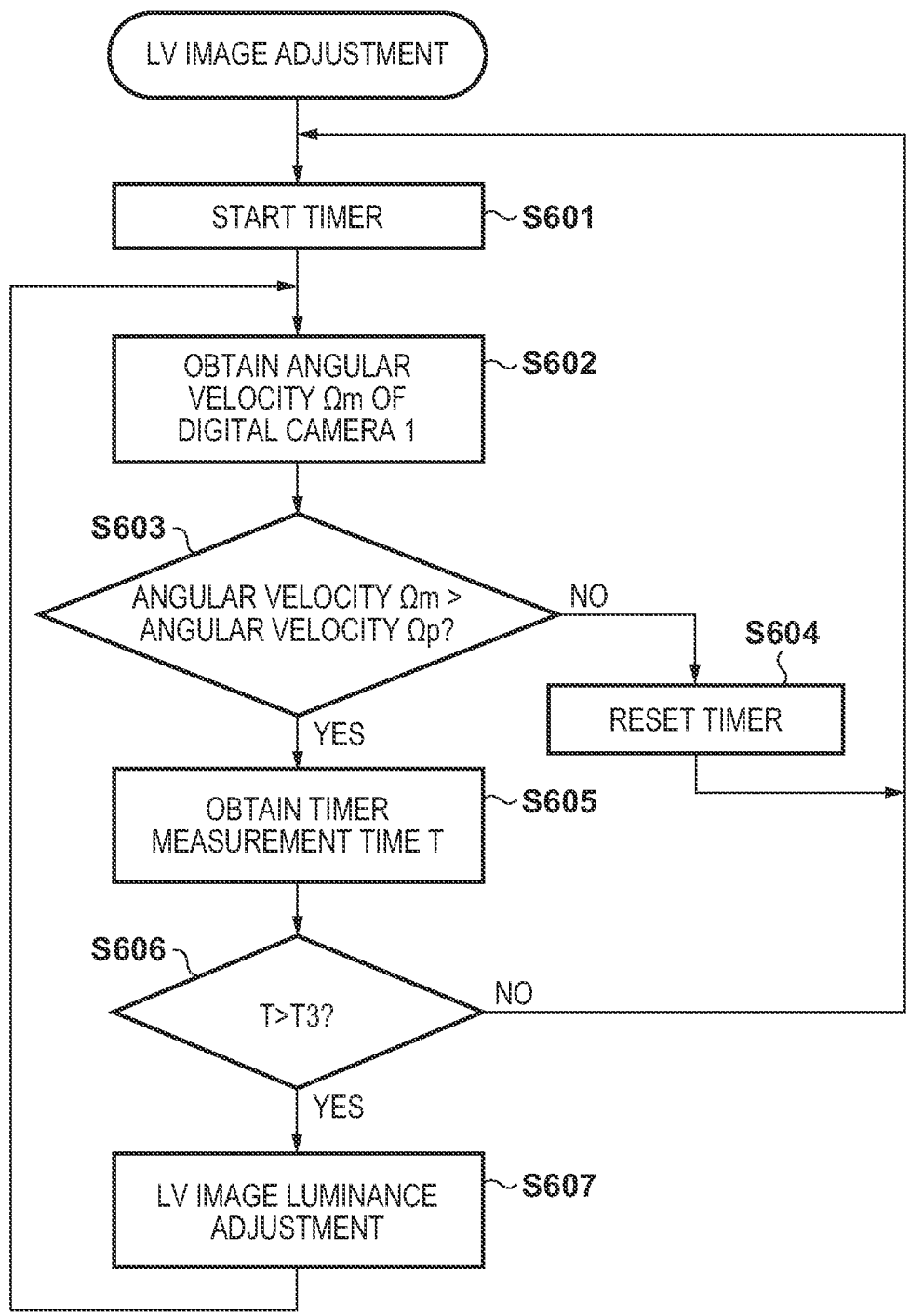
FIG. 7 is a flowchart pertaining to LV image adjustment operations, according to a fourth embodiment.

FIG. 7 is a flowchart pertaining to LV image luminance adjustment operations, according to the present embodiment. Note that the control unit 104 can execute the processing indicated in either of the flowcharts of FIGS. 3A and 5 as the image luminance adjustment processing executed in step S607 of FIG. 7. At this time, the control unit 104 executes the operations illustrated in the flowchart of FIG. 4F as the operations of step S303 in FIG. 3A and step S313 in FIG. 5.

In the present embodiment, a reference angular velocity $\Omega p$ (deg/sec) is set, and the gain value is determined in response to an angular velocity $\Omega m$ exceeding a reference value (a threshold) being obtained from the movement measuring unit 114 continuously for a set amount of time. The reference angular velocity $\Omega p$ is assumed to be greater than or equal to 0, and is 50 (deg/sec) here, as one example. The reference angular velocity $\Omega p$ can be stored in the ROM 113, for example.

In step S601, the control unit 104 starts the operations of a timer. The timer may be built into the control unit 104, or may be located outside the control unit 104. The timer may, for example, be a counter that counts a pulse number of a clock signal used by the digital camera 1. The timer may correspond to an operation of actually obtaining the current time from a system clock and storing that time in the RAM 112.

In step S602, the control unit 104 obtains the angular velocity $\Omega m$ from the movement measuring unit 114. The angular velocity $\Omega m$ is updated when the LV image is updated.

In step S603, the control unit 104 determines whether or not the obtained angular velocity $\Omega m$ is greater than the reference angular velocity $\Omega p$ (the threshold). The control unit 104 executes step S605 if the angular velocity $\Omega m$ is determined to be greater than the reference angular velocity $\Omega p$, and executes step S604 if the angular velocity $\Omega m$ is determined to not be greater than the reference angular velocity $\Omega p$.

In step S604, the control unit 104 resets the timer. The measurement of a period for which the angular velocity $\Omega m$ is greater than the reference angular velocity $\Omega p$ ends as a result. The control unit 104 then executes step S601 again. Note that if the timer is a free running counter, the control unit 104 may reset the value of the counter in step S604 (e.g., to 0), and then execute the sequence from step S602 again.

In step S605, the control unit 104 obtains a measured time T from the timer. The control unit 104 can obtain a count value, an amount of elapsed time, or the like as the measured time T, depending on the type of the timer.

In step S606, the control unit 104 determines whether or not the measured time T is greater than a predetermined reference time T3. The control unit 104 executes step S607 if it is determined that the measured time T is greater than the predetermined reference time T3, and executes step S602 if it is determined that the measured time T is not greater than the predetermined reference time T3. The reference time T3 is assumed to be greater than or equal to 0, and is 500 (msec) here, as one example. The reference time T3 can be stored in the ROM 113, for example.

In this manner, in the present embodiment, the luminance of the LV image is adjusted when greater than or equal to a set amount of movement in the digital camera 1 continues for a set amount of time while a still image is being shot. To be more specific, the luminance of the LV image is adjusted when it is thought that the digital camera 1 is shooting a still image while panning. On the other hand, the luminance of the LV image is not adjusted when shooting a normal still image without panning. This makes it possible to improve the visibility by carrying out effective luminance adjustment only when shooting a moving object.

Taking into account the fact that panning is typically movement in a set direction, the primary direction of the movement not reversing may be used as a condition for the timer to continue measuring time, in addition to the magnitude of the angular velocity.

Fifth Embodiment

Figure 8:
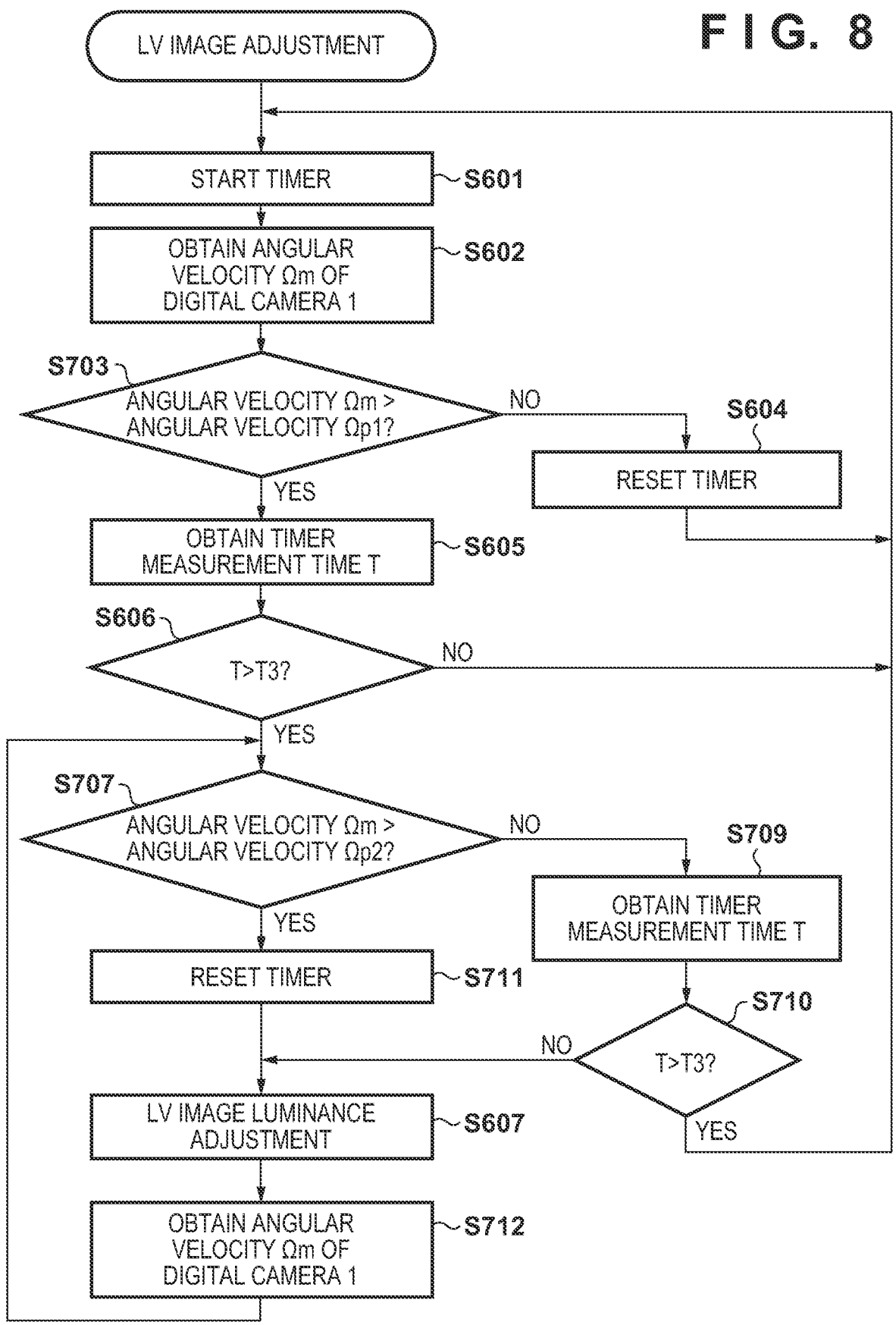
FIG. 8 is a flowchart pertaining to LV image adjustment operations, according to a fifth embodiment.

A fifth embodiment of the present disclosure will be described next. The present embodiment gives hysteresis to the reference angular velocity $\Omega p$ of the fourth embodiment. FIG. 8 is a flowchart pertaining to LV image luminance adjustment operations, according to the present embodiment. Steps that early out the same processing as in FIG. 7 are given the same reference signs.

In the present embodiment, a reference angular velocity $\Omega q1$ (a first threshold) and a reference angular velocity $\Omega q2$ (a second threshold) are used. The reference angular velocity $\Omega q1$ is higher than the reference angular velocity $\Omega q2$. Note that the reference angular velocity $\Omega q1$ and the reference angular velocity $\Omega q2$ can be stored in the ROM 113 in advance.

The control unit 104 obtains the angular velocity $\Omega m$ in step S602, and then executes step S703.

In step S703, the control unit 104 determines whether or not the obtained angular velocity $\Omega m$ is greater than the reference angular velocity $\Omega q1$. The control unit 104 executes step S605 if the angular velocity $\Omega m$ is determined to be greater than the reference angular velocity $\Omega q1$, and executes step S604 if the angular velocity $\Omega m$ is determined to not be greater than the reference angular velocity $\Omega q1$.

The control unit 104 obtains, in step S605, the measured time T from the timer, and determines, in step S606, whether or not the measured time T is greater than the reference time T3. The control unit 104 executes step S707 if it is determined that the measured time T is greater than the reference time T3, and executes step S601 if it is determined that the measured time T is not greater than the reference time T3.

In step S707, the control unit 104 determines whether or not the angular velocity $\Omega m$ is greater than the reference angular velocity $\Omega q2$. The control unit 104 executes step S711 if the angular velocity $\Omega m$ is determined to be greater than the reference angular velocity $\Omega q2$, and executes step S709 if the angular velocity $\Omega m$ is determined to not be greater than the reference angular velocity $\Omega q2$.

In steps S709 and S710, the control unit 104 determines whether or not the measured time T from the timer is greater than the reference time T3, in the same manner as in steps S605 and S606. The control unit 104 executes step S601 if it is determined that the measured time T is greater than the reference time T3, and executes step S607 if it is determined that the measured time T is not greater than the reference time T3.

On the other hand, in step S711, the control unit 104 resets the timer in the same manner as in step S604, and then executes step S607.

In step S607, after adjusting the luminance of the LV image, the control unit 104 executes step S712, and obtains the angular velocity $\Omega m$ from the movement measuring unit 114, in the same manner as in step S602. The control unit 104 then executes step S707.

If there is only one reference angular velocity, and the movement of the digital camera 1 has shifted in the vicinity of the reference angular velocity, a situation can arise in which the LV display quickly switches between an LV image in which the luminance has been adjusted and an LV image in which the luminance has not been adjusted. In this case, there is a risk that the visibility of the LV image will decrease.

In the present embodiment, two reference angular velocities having different magnitudes are used, and when a condition for adjusting the luminance of the LV image has been met, it is determined whether or not it is necessary to continue the luminance adjustment using the lower reference angular velocity. Accordingly, it is more difficult for the luminance adjustment to be suspended after the luminance has been adjusted once, as compared to when only one reference angular velocity is used; this makes it possible to suppress a decrease in the visibility when the movement of the digital camera 1 has shifted in the vicinity of the reference angular velocity used first (i.e., the higher reference angular velocity).

Sixth Embodiment

A sixth embodiment of the present disclosure will be described next. The present embodiment can be carried out using the digital camera 1 illustrated in FIG. 1, and thus descriptions of the configuration of the digital camera 1 will be skipped. FIGS. 9A to 9D are flowcharts pertaining to LV image luminance adjustment operations, according to the present embodiment. In the sixth to eighth embodiments, the brightness and/or tone of the LV image is adjusted by compositing an image of a specific color with the LV image displayed repeatedly in a period where the LV image cannot be updated due to a still image being shot. If the specific color is achromatic, this compositing is equivalent to adjusting the luminance of the LV image.

Figure 9A:
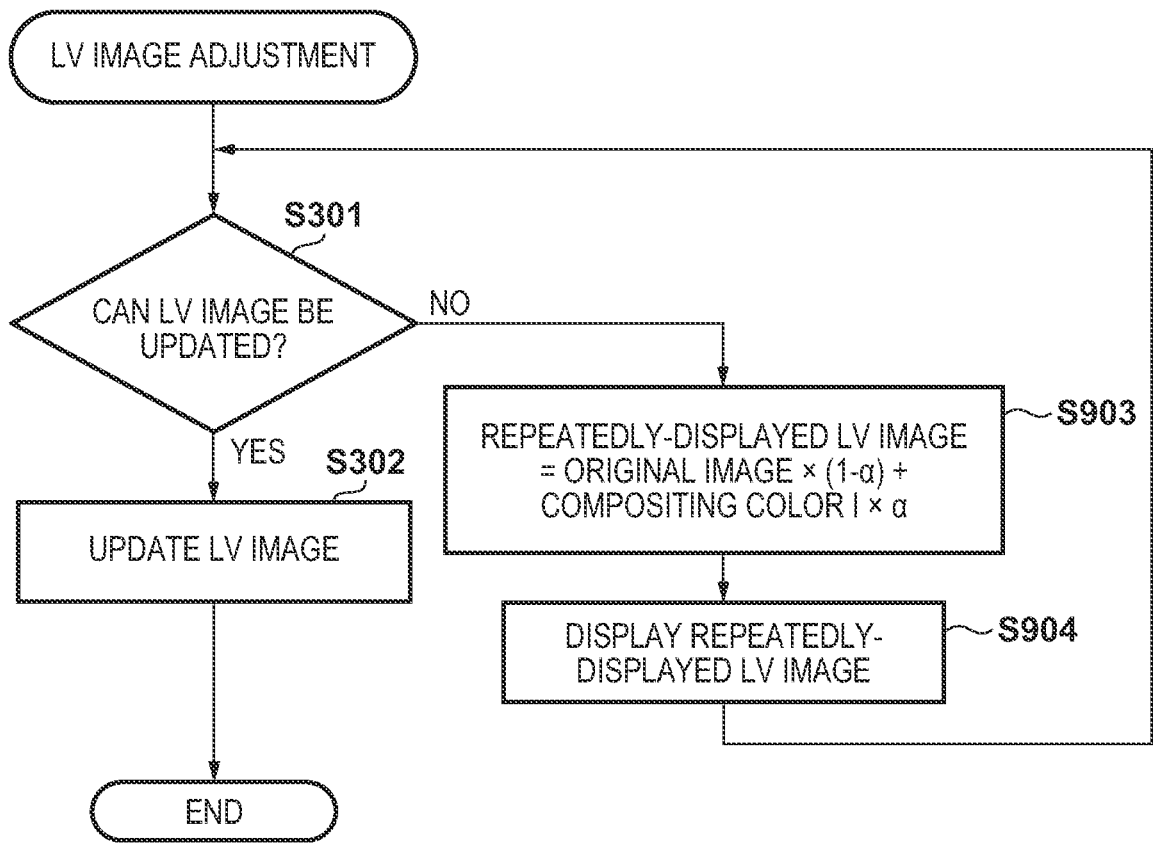

The flowchart in FIG. 9A illustrates operations carried out when adjusting the brightness and/or tone of the LV image depending on whether or not the LV display can be updated. The control unit 104 executes these operations when starting the operations for shooting a still image. In FIG. 9A, steps in which the same operations as in the first embodiment are carried out have been given the same reference signs as those in FIG. 3A.

In step S301, the control unit 104 determines whether or not the LV image can be updated, and moves the sequence to step S302 if it is determined that the LV image can be updated, and to step S903 if not. For example, the control unit 104 can determine that the LV image can be updated if the image processing by the image processing unit 101, or the processing by the display unit 102, has been completed up to a certain stage at the timing of the display V sync, for the LV image shot after the LV image currently being displayed.

In step S302, the control unit 104 causes the new LV image to be displayed in the display device 103 through the display unit 102.

In step S903, the control unit 104 adjusts the brightness and/or tone of the LV image displayed repeatedly. In the present embodiment, the brightness and/or tone of the LV image displayed repeatedly is adjusted by displaying composite LV image data obtained by compositing the LV image displayed repeatedly (the original image) with adjusted image data having a specific color (called a "compositing color I"). The adjusted image data may be an image having the same resolution (number of pixels) as the LV image data, but constituted only by pixels of the compositing color I.

A compositing ratio α (0<α<1) of the adjusted image data used when generating the composite LV image data may be a fixed value, or may be a value determined dynamically on the basis of some kind of condition. Likewise, the compositing color I may be a fixed color (e.g., black), or may be determined on the basis of some kind of condition. The compositing color I may be an achromatic or chromatic color.

In step S904, the control unit 104 controls the display unit 102 so that the LV image for which the brightness and/or tone has been adjusted is displayed from the next display V sync. The control unit 104 then returns the sequence to step S301, and the processing of steps S903 and S904 is repeated until it is determined that the LV image can be updated.

In the example illustrated in FIG. 9A, the compositing ratio α is constant regardless of the number of times the same original image is displayed repeatedly (the number of frames for which the image is displayed repeatedly). However, FIGS. 9B to 9D illustrate examples in which the compositing ratio α and the compositing color I are determined dynamically. The control unit 104 can execute the operations of one of FIGS. 9B to 9D in place of the operations of step S903 in FIG. 9A.

The flowchart in FIG. 9B illustrates an example in which the compositing ratio α and the compositing color I are determined in accordance with the number of frames for which the LV display is not updated.

In step S911, the control unit 104 obtains the number of times (number of frames) N for which the LV image cannot be updated due to still image shooting and the most recent LV image (the original image) will therefore be displayed repeatedly. The control unit 104 can find the number of times N (called the "number of frames N for which the image is displayed repeatedly" hereinafter) on the basis of the still image exposure time determined before shooting, the time it will likely take for image processing on the still image, and the like, for example, but the number of times N may be found through another method instead.

In step S912, the control unit 104 determines the compositing color I and the compositing ratio α for the image of the compositing color I. It is assumed here that the control unit 104 determines the compositing color I as Yn×(1−An×N) and the compositing ratio α as An×N. An is a fixed coefficient, and An is set so that the compositing ratio α=An×N is greater than 0 and less than or equal to 1. For example, An can be determined so as to be a specific compositing ratio α (≤1) when N is a maximum value. Alternatively, An×N may be set to 1 if An×N will exceed 1.

Here, the compositing color I may also be a fixed color, such as black, which is achromatic, in accordance with the compositing ratio α (=An×N). Yn is a predetermined reference luminance value. The compositing color I is an achromatic color having a luminance that becomes closer to the reference luminance value as N increases, Note, however, that the compositing color I may be a chromatic color. Although both the compositing ratio α and the compositing color I are described here as being determined on the basis of the number of frames N for which the image is displayed repeatedly, one of these may be fixed.

In step S913, the control unit 104 notifies the image processing unit 101 or the display unit 102 of the compositing color I and the compositing ratio α determined in step S912. The image processing unit 101 or the display unit 102 generates LV image data for updating by compositing an image having the compositing color I with the LV image data (original image data) used most recently at the compositing ratio α. More specifically, the image processing unit 101 or the display unit 102 generates the image data for updating as:

image data for updating=original image data×(1−α)+ compositing color $I$ image×α

For example, when the compositing color I is black, the original image data and the black image data are composited at ratios of (1−α) and α, respectively, and thus data of an image in which the original image has been darkened overall is generated and displayed as the image data for updating. In other words, when the compositing color I is black, the LV image displayed repeatedly is displayed at a darker level as the number of frames N for which the image is repeatedly displayed increases. Additionally, when the compositing color I is based on the number of frames N, the LV image displayed repeatedly is displayed with a tone that is closer to the image of the compositing color I than to the original image. In other words, the tone of the LV image becomes closer to the compositing color I as the number of frames N for which the LV image is displayed repeatedly increases.

The flowchart in FIG. 9C illustrates an example in which the compositing ratio α and the compositing color I are determined in accordance with the length of a period for which the LV display is not updated. In step S921, the control unit 104 obtains the period Tc (msec) for which the LV image cannot be updated due to still image shooting and the most recent LV image will therefore be displayed repeatedly. The control unit 104 can obtain the period Tc by, for example, multiplying the number of frames N for which the image is displayed repeatedly by a frame period, as per step S911 of FIG. 9A, but the period Tc may be obtained through another method as well.

In step S922, the control unit 104 determines the compositing color I and the compositing ratio α for the image of the compositing color I. It is assumed here that the control unit 104 determines the compositing color I as Yc×(1−Ac×Tc) and the compositing ratio α as Ac×Tc. Ac is a fixed coefficient, and Ac is set so that the compositing ratio α=Ac×Tc is greater than 0 and less than or equal to 1. For example, Ac can be determined so as to be a specific compositing ratio α (≤1) when Tc is a maximum value. Alternatively, Ac×Tc may be set to 1 if Ac×Tc will exceed 1.

Here, the compositing color I may also be a fixed color, such as black, which is achromatic, in accordance with the compositing ratio α (=Ac×Tc). Yc is a predetermined reference luminance value. The compositing color I is an achromatic color having a luminance that becomes closer to the reference luminance value Yc as Tc increases. Note, however, that the compositing color I may be a chromatic color. Although both the compositing ratio $\alpha$ and the compositing color I are described here as being determined on the basis of the period Tc, one of these may be fixed.

The operations carried out in step S913 are as described above. For example, when the compositing color I is black, the LV image displayed repeatedly is displayed at a darker level as the period Tc becomes longer. Additionally, when the compositing color I is based on the period Tc, the LV image displayed repeatedly is displayed with a tone that is closer to the image of the compositing color I than to the original image. In other words, the tone of the LV image becomes closer to the compositing color I as the period Tc for which the most recent LV image is displayed (or the period for which the LV image is not updated) becomes longer.

The flowchart in FIG. 9D illustrates an example in which the compositing ratio $\alpha$ and the compositing color I are determined in accordance with the length of the still image exposure time Ts. In step S931, the control unit 104 obtains an exposure time Ts (sec) used in the still image shooting. The control unit 104 can, for example, obtain the exposure time Ts on the basis of exposure conditions determined before the start of still image shooting, but may obtain the exposure time Ts through another method as well.

In step S932, the control unit 104 determines the compositing color I and the compositing ratio $\alpha$ for the image of the compositing color I. It is assumed here that the control unit 104 determines the compositing color I as Ys×(1−As×Ts) and the compositing ratio $\alpha$ as As×Ts. As is a fixed coefficient, and As is set so that the compositing ratio $\alpha$=As×Ts is greater than 0 and less than or equal to 1. For example, As can be determined so as to be a specific compositing ratio $\alpha$ (≤1) when Ts is a maximum value. Alternatively, As×Ts may be set to 1 if As×Ts will exceed 1.

Here, the compositing color I may also be a fixed color, such as black, which is achromatic, in accordance with the compositing ratio $\alpha$ (=As×Ts). Ys is a predetermined reference luminance value. The compositing color I is an achromatic color having a luminance that becomes closer to the reference luminance value Ys as Ts increases. Note, however, that the compositing color may be a chromatic color. Although both the compositing ratio $\alpha$ and the compositing color I are described here as being determined on the basis of the exposure time Ts, one of these may be fixed.

The operations carried out in step S913 are as described above. For example, when the compositing color I is black, the LV image displayed repeatedly is displayed at a darker level as the exposure time Ts becomes longer. Additionally, when the compositing color I is based on the exposure time Ts, the LV image displayed repeatedly is displayed with a tone that is closer to the image of the compositing color I than to the original image. In other words, the tone of the LV image becomes closer to the compositing color I as the exposure time Ts for still image shooting becomes longer.

The operations illustrated in the flowcharts of FIGS. 9B to 9D have been described as being executed in place of step S903 in FIG. 9A. In this case, the LV image adjustment is carried out with each display V sync. On the other hand, the operations illustrated in the flowcharts of FIGS. 9B to 9D may be executed in response to a still image shooting instruction. In this case, a lower limit value of the compositing ratio $\alpha$ is set to 0 in order to handle situations where the LV image can be updated.

As described thus far with reference to FIGS. 9A to 9D, adjusting the brightness and/or tone of the frame image displayed repeatedly as the LV display makes it possible to avoid both a situation where object movement becomes unnatural and a completely blacked-out display. Accordingly, a smooth live view display with good visibility can be implemented in a period where the LV image cannot be updated due to a still image being shot.

Seventh Embodiment

A seventh embodiment of the present disclosure will be described next. In the present embodiment, the compositing color I and the compositing ratio $\alpha$ for the image of the compositing color I are determined taking into account other information, such as information obtained from the displayed LV image, in addition to the number of frames N for which the LV image is displayed repeatedly.

FIGS. 10A to 10F are flowcharts pertaining to operations for determining the compositing color I and the compositing ratio $\alpha$, according to the present embodiment. Here, a configuration in which the compositing color I and the compositing ratio $\alpha$ are determined on the basis of the number of frames N for which the image is displayed repeatedly and other information will be described as an example. Note that in FIGS. 10A to 10F, steps carrying out the same processing as those in FIG. 9B will be given the same reference signs.

The operations illustrated in FIGS. 10A to 10F can be executed in place of step S903 in FIG. 9A, in the same manner as the operations illustrated in FIG. 9B. The generation of a composite LV image based on the compositing color I and the compositing ratio $\alpha$ determined according to the present embodiment may be carried out by the image processing unit 101 or the display unit 102.

FIG. 10A illustrates an example in which the compositing color I and the compositing ratio $\alpha$ are determined taking into account luminance information of the LV image. In step S911, the control unit 104 obtains the number of frames N for which the LV image is displayed repeatedly. Then, in step S1002, the control unit 104 obtains the luminance Y pertaining to the overall LV image displayed repeatedly (before luminance correction), in the same manner as in step S402 in the second embodiment, for example.

In step S1003, the control unit 104 determines the compositing color I and the compositing ratio $\alpha$ to be applied to the original image. It is assumed here that the control unit 104 determines the compositing color I and the compositing ratio $\alpha$ as Y×(1−An×N) and An×N×By×Y respectively. An is a fixed coefficient, and the value of An can be determined, for example, on the basis of a predetermined maximum number for N, so that the value of An×N is greater than 0 and less than or equal to 1. Alternatively, if the real value of An×N has exceeded 1, 1 may be used. By is a fixed coefficient, and the value of By can be determined, for example, on the basis of a predetermined maximum value of the luminance Y, so that the value of By×Y is greater than 0 and less than or equal to 1. Alternatively, if the real value of By×Y has exceeded 1, 1 may be used.

In this case, the compositing ratio $\alpha$ increases as the luminance Y increases and as N increases. Additionally, the compositing color I becomes an achromatic color darker than the luminance Y as the luminance Y increases and the number of frames N for which the image is displayed repeatedly increases. Although the compositing color I is described here as being an achromatic color based on the luminance Y and the number of frames N for which the image is displayed repeatedly, the compositing color I may be a fixed color such as black. Note, however, that the compositing color I may be a chromatic color. Although both the compositing ratio α and the compositing color I are described here as being determined on the basis of the luminance Y, one of these may be independent from the luminance Y (dependent only on the number of frames N for which the image is displayed repeatedly).

In step S913, the control unit 104 notifies the image processing unit 101 or the display unit 102 of the compositing color I and the compositing ratio α determined in step S912. The image processing unit 101 or the display unit 102 generates LV image data for updating by compositing an image having the compositing color I with the LV image data (original image data) used most recently at the compositing ratio α. More specifically, the image processing unit 101 or the display unit 102 generates the image data for updating as:

$$\text{image data for updating} = \text{original image data} \times (1-\alpha) + \text{compositing color } I \text{ image} \times \alpha$$

The image data for updating is image data closer to the image data of the compositing color I than the original image data. Because the compositing ratio a increases as the luminance Y increases, the repeatedly-displayed LV image is an image that becomes closer to the achromatic color image of the compositing color I as the luminance Y of the original image increases.

FIG. 10B illustrates another example in which the compositing color I and the compositing ratio α are determined taking into account luminance information of the LV image. In step S911, the control unit 104 obtains the number of frames N for which the LV image is displayed repeatedly. Then, in step S1012, the control unit 104 obtains the luminance Yt pertaining to the main object region in the LV image displayed repeatedly (before luminance correction), in the same manner as in step S412 in the second embodiment, for example.

In step S1013, the control unit 104 determines the compositing color I and the compositing ratio α to be applied to the original image. It is assumed here that the control unit 104 determines the compositing color I and the compositing ratio α as Yt×(1−An×N) and An×N×Bt×Yt, respectively. An is the same as described with reference to FIG. 10A. Bt is a fixed coefficient, and the value of Bt can be determined, for example, on the basis of a predetermined maximum value of the luminance Yt, so that the value of Bt×Yt is greater than 0 and less than or equal to 1. Alternatively, the maximum value of Bt×Yt may be set to 1, and when the real value has exceeded 1, 1 may be used.

In this case, the compositing ratio α increases as the luminance Yt increases and as N increases. Additionally, the compositing color I becomes an achromatic color darker than the luminance Yt as the luminance Yt increases and the number of frames N for which the image is displayed repeatedly increases. Although the compositing color I is described here as being an achromatic color based on the luminance Yt and the number of frames N for which the image is displayed repeatedly, the compositing color I may be a fixed color such as black. Note, however, that the compositing color I may be a chromatic color. Although both the compositing ratio α and the compositing color I are described here as being determined on the basis of the luminance Yt, one of these may be independent from the luminance Yt (dependent only on the number of frames N for which the image is displayed repeatedly).

In step S913, the control unit 104 notifies the image processing unit 101 or the display unit 102 of the compositing color I and the compositing ratio α determined in step S912. The image processing unit 101 or the display unit 102 generates the image data for updating in the manner described above.

The image data for updating is image data closer to the image data of the compositing color I than the original image data. Because the compositing ratio α increases as the luminance Yt increases, the repeatedly-displayed LV image is an image that becomes closer to the achromatic color image of the compositing color I as the luminance Yt of the main object region in the original image increases.

FIG. 10C illustrates an example in which the compositing color I and the compositing ratio α are determined taking into account movement of a main object. In step S911, the control unit 104 obtains the number of frames N for which the LV image is displayed repeatedly. Then, in step S1022, the control unit 104 obtains the movement amount Vt pertaining to the main object region in the LV image displayed repeatedly (before the brightness and/or tone is adjusted), in the same manner as in step S422 in the second embodiment, for example.

In step S1023, the control unit 104 determines the compositing color and the compositing ratio α to be applied to the original image. It is assumed here that the control unit 104 determines the compositing color I and the compositing ratio α as Yv(1−An×N×Bv×Vt) and An×N×Bv×Vt, respectively. Here, Yv is a predetermined reference luminance value. An is the same as described with reference to FIG. 10A. Bv is a fixed coefficient, and the value of Bv can be determined, for example, on the basis of a predetermined maximum value of the movement amount Vt, so that the value of Bv×Vt is greater than 0 and less than or equal to 1. Alternatively, the maximum value of Bv×Vt may be set to 1, and when the real value has exceeded 1, 1 may be used.

In this case, the compositing ratio α increases as the movement amount Vt increases and as N increases. Additionally, the compositing color I becomes an achromatic color darker than the luminance Yv as the movement amount Vt increases and the number of frames N for which the image is displayed repeatedly increases. Although the compositing color I is described here as being an achromatic color based on the movement amount Vt and the number of frames N for which the image is displayed repeatedly, the compositing color I may be a fixed color such as black. Note, however, that the compositing color I may be a chromatic color. Although both the compositing ratio α and the compositing color I are described here as being determined on the basis of the movement amount Vt pertaining to the main object region, one of these may be independent from the movement amount Vt (dependent only on the number of frames N for which the image is displayed repeatedly).

In step S913, the control unit 104 notifies the image processing unit 101 or the display unit 102 of the compositing color I and the compositing ratio α determined in step S912. The image processing unit 101 or the display unit 102 generates the image data for updating in the manner described above.

The image data for updating is image data closer to the image data of the compositing color I than the original image data. Because the compositing ratio α increases as the movement amount Vt pertaining to the main object region increases, the repeatedly-displayed LV image is an image that becomes closer to the achromatic color image of the compositing color I as the movement amount Vt pertaining to the main object region in the original image increases.

FIG. 10D illustrates an example in which the compositing color I and the compositing ratio α are determined in a case where an LV image generated from a still image can be displayed. For example, when an LV image cannot be shot due to still image shooting, it is conceivable to generate an LV image from a still image obtained by shooting a still image. In this case, the image processing unit 101 or the display unit 102 generates the LV image (the original image) from still image data held in the temporary storage unit 107.

In step S911, the control unit 104 obtains the number of frames N for which the LV image is displayed repeatedly. Then, in step S1032, the control unit 104 determines the type of the displayed LV image. Specifically, the control unit 104 determines whether or not the displayed LV image was generated from a still image, in the same manner as in step S432 in the second embodiment.

Then, the control unit 104 determines the value of a coefficient Bs used when determining the compositing color I and the compositing ratio α. Here, the control unit 104 sets the coefficient Bs for the case where the LV image generated from a still image is displayed to a predetermined fixed value in a range of 0<Bs<1, and sets the coefficient Bs to 1 for the case where an LV image not generated from a still image (i.e., captured in the moving image mode) is displayed.

In step S1033, the control unit 104 determines the compositing color I and the compositing ratio α to be applied to the original image. It is assumed here that the control unit 104 determines the compositing color I and the compositing ratio α as Ybs(1−An×N×Bs) and An×N×Bs, respectively. Here, Ybs is a predetermined reference luminance value. An is the same as described with reference to FIG. 10A.

In this case, the compositing ratio α increases more when an LV image shot in the moving image mode is repeatedly displayed than when an LV image generated from a still image is displayed. Additionally, the compositing color I becomes a darker achromatic color when an LV image shot in the moving image mode is repeatedly displayed than when an LV image generated from a still image is displayed. This is because the still image used to generate the LV image has been shot after the LV image shot in the moving image mode. Although the compositing color I is described here as being an achromatic color based on the reference luminance value Ybs, the compositing color I may be a fixed color such as black. Note, however, that the compositing color I may be a chromatic color. Although both the compositing ratio α and the compositing color I are described here as being determined on the basis of the coefficient Bs, which is based on whether the displayed LV image was generated from a still image or from a moving image, one of these may be independent from the coefficient Bs (dependent only on the number of frames N for which the image is displayed repeatedly).

In step S913, the control unit 104 notifies the image processing unit 101 or the display unit 102 of the compositing color I and the compositing ratio α determined in step S912. The image processing unit 101 or the display unit 102 generates the image data for updating in the manner described above.

The image data for updating is image data closer to the image data of the compositing color I than the original image data. Additionally, the compositing ratio α is higher when the LV image is generated from a still image than when the LV image is generated from a moving image. As such, the repeatedly-displayed LV image is an image closer to an achromatic color image of the compositing color I when the LV image is generated from a still image than when the LV image is generated from a moving image.

FIG. 10E illustrates an example in which the compositing color I and the compositing ratio α are determined taking into account the still image shooting mode. Here, the still image shooting mode is assumed to be one of shooting a single image (single shooting), low-speed continuous shooting, and high-speed continuous shooting. In step S911, the control unit 104 obtains the number of frames N for which the LV image is displayed repeatedly.

In step S1042, the control unit 104 obtains the still image shooting mode which is set from the RAM 112, for example. A coefficient Gm for each still image shooting mode is stored in the ROM 113 as a table, for example. Here, the coefficient Gm is assumed to be 0.4 for single shooting, 0.6 for low-speed continuous shooting, and 0.8 for high-speed continuous shooting, as in the second embodiment.

In step S1043, the control unit 104 determines the compositing color and the compositing ratio α to be applied to the original image. It is assumed here that the control unit 104 determines the compositing color I and the compositing ratio α as Ym(1−An×N×Gm) and An×N×Gm, respectively. Here, Ym is a predetermined reference luminance value. An is the same as described with reference to FIG. 10A.

In this case, the compositing ratio α increases as the coefficient Gm increases, i.e., as the speed of the continuous shooting increases. Additionally, the compositing color I becomes a darker achromatic color as the coefficient Gm increases, i.e., as the speed of the continuous shooting increases. Although the compositing color I is described here as being an achromatic color based on the reference luminance value Ym, the compositing color I may be a fixed color such as black. Note, however, that the compositing color I may be a chromatic color. Although both the compositing ratio α and the compositing color I are described here as being determined on the basis of the coefficient Gm which is based on the shooting mode, one of these may be independent from the coefficient Gm (dependent only on the number of frames N for which the image is displayed repeatedly).

In step S913, the control unit 104 notifies the image processing unit 101 or the display unit 102 of the compositing color I and the compositing ratio α determined in step S912. The image processing unit 101 or the display unit 102 generates the image data for updating in the manner described above.

The image data for updating is image data closer to the image data of the compositing color I than the original image data. Additionally, the compositing ratio α increases as the coefficient Gm increases. In the example described above, the coefficient Gm increases as the shooting mode takes on a higher shooting speed, and thus the repeatedly-displayed LV image becomes an image closer to the achromatic color image of the compositing color I. Note that this configuration can be applied for shooting modes aside from the continuous shooting mode by using the same method.

FIG. 10F illustrates an example in which the compositing color I and the compositing ratio α are determined taking into account movement of the digital camera 1. In step S911, the control unit 104 obtains the number of frames N for which the LV image is displayed repeatedly.

Then, in step S1052, the control unit 104 obtains, from, for example, the movement measuring unit 114 illustrated in FIG. 6, a signal indicating the angular velocity Ωm (deg/sec) as the movement of the digital camera 1. The angular velocity Ωm is updated when the LV image is updated. Note that if the movement measuring unit 114 outputs angular velocities for a plurality of rotation axes, the control unit 104 finds a single representative angular velocity from the plurality of angular velocities through a predetermined method. For example, the representative angular velocity may be the highest of the plurality of angular velocities, or may be an average value or a total value of the plurality of angular velocities. When the movement measuring unit 114 outputs angular velocities for a plurality of rotation axes, the "angular velocity $\Omega m$" is assumed to refer to the representative angular velocity hereinafter.

In step S1053, the control unit 104 determines the compositing color I and the compositing ratio $\alpha$ to be applied to the original image. It is assumed here that the control unit 104 determines the compositing color I and the compositing ratio $\alpha$ as $Yv(1-An\times N\times\Omega m)$ and $An\times N\times Bp\times\Omega m$, respectively. Here, Yv is a predetermined reference luminance value. An is the same as described with reference to FIG. 10A. Bp is a fixed coefficient, and the value of Bp can be determined, for example, so that the value of $Bp\times\Omega m$ is greater than 0 and less than or equal to 1, within a predetermined range of values which the angular velocity $\Omega m$ can take on. Alternatively, when $Bp\times\Omega m$ exceeds an upper limit value of 1, the value may be corrected (clipped) to 1.

In this case, the compositing ratio $\alpha$ increases as the angular velocity $\Omega m$ increases. Additionally, the compositing color I becomes a darker achromatic color as the angular velocity $\Omega m$ increases. Although the compositing color I is described here as being an achromatic color based on the reference luminance value Yv, the compositing color I may be a fixed color such as black. Note, however, that the compositing color I may be a chromatic color. Although both the compositing ratio $\alpha$ and the compositing color I are described here as being determined on the basis of the angular velocity $\Omega m$, one of these may be independent from the angular velocity $\Omega m$ (dependent only on the number of frames N for which the image is displayed repeatedly).

In step S913, the control unit 104 notifies the image processing unit 101 or the display unit 102 of the compositing color I and the compositing ratio $\alpha$ determined in step S912. The image processing unit 101 or the display unit 102 generates the image data for updating in the manner described above.

The image data for updating is image data closer to the image data of the compositing color I than the original image data. Because the compositing ratio $\alpha$ increases as the angular velocity $\Omega m$ increases, the repeatedly-displayed LV image is an image that becomes closer to the achromatic color image of the compositing color I as the angular velocity $\Omega m$ increases.

Although the movement of the digital camera 1 is described as being measured using the movement measuring unit 114 here, the movement of the digital camera 1 may be measured from the LV image. For example, movement of the image as a whole may be detected in the same manner as the movement of the main object region is detected in step S1012, and that movement may be used as the movement of the digital camera 1.

Additionally, a situation where the compositing color I and the compositing ratio $\alpha$ are determined taking into account other information in the operations described in the sixth embodiment with reference to FIG. 9B has been described here with reference to FIGS. 10A to 10F. However, the configuration of the present embodiment can also be applied in combination with the configurations illustrated in FIGS. 9C and 9D.

According to the present embodiment, the compositing color I and the compositing ratio $\alpha$ are determined taking into account other information, in addition to the effects of the sixth embodiment. As such, the brightness and/or tone for the repeatedly-displayed LV image can be adjusted at a finer level. This makes it possible to improve the visibility of the live view display in a period where the LV image is not updated.

Eighth Embodiment

An eighth embodiment of the present disclosure will be described next. The present embodiment describes a configuration in which the brightness and/or tone of the LV image is changed as the number of times the LV image based on the same original image is displayed repeatedly increases. The present embodiment can be combined with the configurations of the sixth and seventh embodiments (configurations where the brightness and/or tone of the LV image being displayed repeatedly is fixed). A configuration combined with the configuration described in the sixth embodiment with reference to FIG. 9B will be described here. In FIG. 11, steps carrying out the same processing as those in FIG. 9B will be given the same reference signs. The generation of a composite LV image based on the compositing color I and the compositing ratio $\alpha$ determined according to the present embodiment may be carried out by the image processing unit 101 or the display unit 102.

In step S911, the control unit 104 obtains the number of frames N for which the LV image is displayed repeatedly.

In step S1103, the control unit 104 resets a loop number K to 1.

In step S1104, the control unit 104 determines the compositing color I and the compositing ratio $\alpha$. It is assumed here that the control unit 104 determines the compositing color I and the compositing ratio $\alpha$ as $Yk\times(1-Ck\times K)$ and $Ck\times K$, respectively. Here, Yk is a predetermined reference luminance value. Although the compositing color I is described here as being an achromatic color based on the reference luminance value Yk, the compositing color I may be a fixed color such as black. Note, however, that the compositing color I may be a chromatic color.

Ck is a fixed coefficient, and the value of Ck can be determined so that the value of $Ck\times K$ (the compositing ratio $\alpha$) takes on a target value greater than 0 and less than or equal to 1 when K=N. Alternatively, if the real value of $Ck\times K$ has exceeded 1, 1 may be used. The compositing ratio $\alpha$ increases as K approaches N. Additionally; the compositing color I becomes a dark achromatic color. Accordingly, the brightness of the LV image decreases in each frame during the period in which the same LV image is displayed repeatedly. Although both the compositing ratio $\alpha$ and the compositing color I are described here as being different in each frame in which an LV image based on the same original image is displayed, one of these may be a fixed value.

In step S913, the control unit 104 notifies the image processing unit 101 or the display unit 102 of the compositing color I and the compositing ratio $\alpha$ determined in step S1104. The image processing unit 101 or the display unit 102 generates the image data for updating in the manner described above.

In step S1105, the control unit 104 determines whether or not the loop number K has become equal to the number of frames N for which the image is displayed repeatedly, obtained in step S911. If so, the sequence ends, but if not, the sequence moves to step S1106. In step S1106, the control unit 104 increments the loop number K by 1 and executes the processing again from step S1104. In this manner, a composite LV image which differs in each frame is displayed until the number of times for which the LV image is repeatedly displayed reaches N, obtained in step S911.

A configuration in which the compositing ratio α and/or the compositing color I is changed as the number of times the image is displayed repeatedly increases, in the operations described in the sixth embodiment with reference to FIG. 9B, has been described here. However, the configuration of the present embodiment can also be applied in combination with the configurations illustrated in FIGS. 9C and 9D. In this case, if the period Tc, the exposure time Ts, or the like extends across a plurality of frames, the compositing ratio α and/or the compositing color I may be changed for each frame.

According to the present embodiment, the brightness and/or tone of the LV image is changed gradually each time the same LV image is repeatedly changed, in addition to the effects of the sixth and seventh embodiments. This makes it possible to control the changes in the live view display to occur more smoothly in a period where the LV image is not updated. As such, a live view display that has even higher quality than that of the sixth and seventh embodiments can be realized.

Other Embodiments

The LV image luminance adjustment operations described in the foregoing embodiments may be carried out when the image processing unit 101 generates the LV image, or when the display unit 102 displays the LV image in the display device 103.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-123133, filed on Jul. 1, 2019, and No. 2020-084135, filed on May 12, 2020, which are hereby incorporated by reference herein in their entirety.

What is claimed is:

1. An image capture apparatus, comprising:
an image sensor; and
a processor that executes a program stored in a memory and thereby functions as:
a control unit configured to carry out control so that, when an instruction to shoot a still image has been detected when executing a live view display by shooting a moving image using the image sensor and displaying the moving image obtained through the shooting, the image sensor shoots the still image preferentially, and a same image is repeatedly displayed during a period in which the live view display cannot be updated due to the shooting of the still image,
wherein the control unit reduces a luminance of the image that is repeatedly displayed based on a length of an exposure time in the shooting of the still image, and
wherein the control unit determines an amount of reduction of the luminance so that the amount of reduction of the luminance increases as a length of an exposure time in the shooting of the still image increases.

2. An image capture apparatus, comprising:
an image sensor; and
a processor that executes a program stored in a memory and thereby function as:
a control unit configured to carry out control so that, when an instruction to shoot a still image has been detected when executing a live view display by shooting a moving image using the image sensor and displaying the moving image obtained through the shooting, the image sensor shoots the still image preferentially, and a same image is repeatedly displayed during a period in which the live view display cannot be updated due to the shooting of the still image, wherein the control unit reduces a luminance of the image that is repeatedly displayed, and
wherein the control unit determines an amount of reduction of the luminance taking any of: information obtained from an image that is displayed, a type of the image that is displayed, a still image shooting mode, and movement of the image capture apparatus, into account.

3. The image capture apparatus according to claim 2, wherein the information obtained from an image that is displayed is a luminance of the entire image or a main object, and the control unit determines the amount of reduction of the luminance so that the amount of reduction of the luminance increases as the luminance of the entire image or the main object increases.

4. The image capture apparatus according to claim 2, wherein the information obtained from an image that is displayed is an amount of movement of a main object, and the control unit determines the amount of reduction of the luminance so that the amount of reduction of the luminance increases as the amount of movement increases.

5. The image capture apparatus according to claim 2, wherein the type of the image that is displayed indicates that the image that is displayed is (i) an image generated from an image obtained by either shooting a still image or (ii) an image generated from an image obtained by shooting a moving image, and the control unit determines the amount of reduction of the luminance so that the amount of reduction of the luminance to be higher when the image that is displayed is (ii) the image generated from an image obtained by shooting a moving image than when the image that is displayed is (i) the image generated from an image obtained by shooting a still image.

6. The image capture apparatus according to claim 2, wherein the still image shooting mode includes a plurality of still image shooting modes having different continuous shooting speeds, and the control unit determines the amount of reduction of the luminance so that the amount of reduction of the luminance to be higher for a second still image shooting mode having a higher continuous shooting speed than a first still image shooting mode than for the first still image mode.

7. The image capture apparatus according to claim 2, wherein the control unit determines the amount of reduction of the luminance so that the amount of reduction of the luminance increases as the movement of the image capture apparatus increases.

8. The image capture apparatus according to claim 2, wherein the control unit reduces the luminance of the image that is repeatedly displayed in case where movement of the image capture apparatus continuously exceeds a threshold for a predetermined set amount of time.

9. The image capture apparatus according to claim 2, wherein the control unit starts reducing the luminance of the image that is repeatedly displayed when movement of the image capture apparatus continuously exceeds a first threshold for a first predetermined set amount of time, and stops reducing the luminance of the image that is repeatedly displayed when movement of the image capture apparatus falls below a second threshold continuously for a second predetermined set amount of time, the second threshold being lower than the first threshold.

10. The image capture apparatus according to claim 2, wherein the movement of the image capture apparatus is an angular velocity of the image capture apparatus.

11. An image capture apparatus, comprising:
an image sensor; and
a processor that executes a program stored in a memory and thereby functions as:
a control unit configured to carry out control so that, when an instruction to shoot a still image has been detected when executing a live view display by shooting a moving image using the image sensor and displaying the moving image obtained through the shooting, the image sensor shoots the still image preferentially, and a same image is repeatedly displayed during a period in which the live view display cannot be updated due to the shooting of the still image,
wherein the control unit changes the tone of the image that is repeatedly displayed, by compositing an adjustment image having a specific color with the image that is repeatedly displayed, based on a length of an exposure time in the shooting of the still image,
wherein the control unit determines a compositing ratio of the specific color and/or the adjustment image on the basis of the length of the exposure time in the shooting of the still image, and
wherein the control unit determines the compositing ratio of the adjustment image so that the compositing ratio of the adjustment image increases as a length of an exposure time in the shooting of the still image increases.

12. The image capture apparatus according to claim 11, wherein the specific color is black or an achromatic color, and when the specific color is the achromatic color, the specific color has a brightness based on a length of an exposure time in the shooting of the still image.

13. The image capture apparatus according to claim 11, wherein the specific color is black or an achromatic color, and when the specific color is the achromatic color, the specific color has a brightness based on any one of: a luminance of the entire image or of a main object, an amount of movement of the main object, whether the image that is displayed is an image generated from an image obtained by shooting a still image or by shooting a moving image, and a still image shooting mode.

14. An image capture apparatus, comprising: an image sensor; and
a processor that executes a program stored in a memory and thereby functions as:
a control unit configured to carry out control so that, when an instruction to shoot a still image has been detected when executing a live view display by shooting a moving image using the image sensor and displaying the moving image obtained through the shooting, the image sensor shoots the still image preferentially, and a same image is repeatedly displayed during a period in which the live view display cannot be updated due to the shooting of the still image,
wherein the control unit changes the tone of the image that is repeatedly displayed, by compositing an adjustment image having a specific color with the image that is repeatedly displayed, and
wherein the control unit further determines the compositing ratio of the adjustment image taking any of: information obtained from an image that is displayed, a type of the image that is displayed, a still image shooting mode, and movement of the image capture apparatus into account.

15. The image capture apparatus according to claim 14, wherein the information obtained from an image that is displayed is a luminance of the entire image or a main object, and the control unit determines the compositing ratio of the adjustment image so that the compositing ratio of the adjustment image increases as the luminance of the entire image or the main object increases.

16. The image capture apparatus according to claim 14, wherein the information obtained from an image that is displayed is an amount of movement of a main object, and the control unit determines the compositing ratio of the adjustment image so that the compositing ratio of the adjustment image increases as the amount of movement increases.

17. The image capture apparatus according to claim 14, wherein the type of the image that is displayed is either (i) an image generated from an image obtained by shooting a still image or (ii) an image generated from an image obtained by shooting a moving image, and the control unit determines the compositing ratio of the adjustment image so that the compositing ratio of the adjustment image to be higher when the image that is displayed is (ii) the image generated from an image obtained by shooting a moving image than when the image that is displayed is (i) the image generated from an image obtained by shooting a still image.

18. The image capture apparatus according to claim 14, wherein the still image shooting mode includes a plurality of still image shooting modes having different continuous shooting speeds, and the control unit determines the compositing ratio of the adjustment image so that the compositing ratio of the adjustment image to be higher for a second still image shooting mode having a higher continuous shooting speed than a first still image shooting mode than for the first still image shooting mode.

19. The image capture apparatus according to claim 14, wherein the control unit determines the compositing ratio of the adjustment image so that the compositing ratio of the adjustment image increases as the movement of the image capture apparatus increases.

20. A method of controlling an image capture apparatus including an image sensor, the method comprising:
    carrying out control so that, when an instruction to shoot a still image has been detected when executing a live view display by shooting a moving image using the image sensor and displaying the moving image obtained through the shooting, the image sensor shoots the still image preferentially, and an same image is repeatedly displayed during a period in which the live view display cannot be updated due to the shooting of the still image,
    wherein in the control, a luminance of the image that is repeatedly displayed is reduced based on a length of an exposure time in the shooting of the still image, and
    wherein in the control, an amount of reduction of the luminance is determined so that the amount of reduction of the luminance increases as a length of an exposure time in the shooting of the still image increases.

21. A method of controlling an image capture apparatus including an image sensor, the method comprising:
    carrying out control so that, when an instruction to shoot a still image has been detected when executing a live view display by shooting a moving image using the image sensor and displaying the moving image obtained through the shooting, the image sensor shoots the still image preferentially, and a same image is repeatedly displayed during a period in which the live view display cannot be updated due to the shooting of the still image,
    wherein in the control, a luminance of the image that is repeatedly displayed is reduced, and
    wherein in the control, an amount of reduction of the luminance is determined taking any of: information obtained from an image that is displayed, a type of the image that is displayed, a still image shooting mode, and movement of the image capture apparatus, into account.

22. A method of controlling an image capture apparatus including an image sensor, the method comprising:
    carrying out control so that, when an instruction to shoot a still image has been detected when executing a live view display by shooting a moving image using the image sensor and displaying the moving image obtained through the shooting, the image sensor shoots the still image preferentially, and a same image is repeatedly displayed during a period in which the live view display cannot be updated due to the shooting of the still image,
    wherein in the control, the tone of the image that is repeatedly displayed is changed, by compositing an adjustment image having a specific color with the image that is repeatedly displayed, based on a length of an exposure time in the shooting of the still image,
    wherein in the control, a compositing ratio of the specific color and/or the adjustment image is determined on the basis of the length of the exposure time in the shooting of the still image, and
    wherein in the control, the compositing ratio of the adjustment image is determined so that the compositing ratio of the adjustment image increases as a length of an exposure time in the shooting of the still image increases.

23. A method of controlling an image capture apparatus including an image sensor, the method comprising:
    carrying out control so that, when an instruction to shoot a still image has been detected when executing a live view display by shooting a moving image using the image sensor and displaying the moving image obtained through the shooting, the image sensor shoots the still image preferentially, and a same image is repeatedly displayed during a period in which the live view display cannot be updated due to the shooting of the still image,
    wherein in the control, the tone of the image that is repeatedly displayed is changed, by compositing an adjustment image having a specific color with the image that is repeatedly displayed, and
    wherein in the control, the compositing ratio of the adjustment image is determined taking any of: information obtained from an image that is displayed, a type of the image that is displayed, a still image shooting mode, and movement of the image capture apparatus into account.

* * * * *